US012812722B2

(12) United States Patent
Mohammad Soleymani et al.

(10) Patent No.: US 12,812,722 B2
(45) Date of Patent: Nov. 24, 2026

(54) METHODS FOR OPERATING MODES FOR SIDELINK DISCONTINUOUS RECEPTION

(71) Applicant: Fraunhofer-Gesellschaft zur Foerderung der angewandten Forschung e.V., Munich (DE)

(72) Inventors: Dariush Mohammad Soleymani, Erlangen (DE); Martin Leyh, Erlangen (DE); Elke Roth-Mandutz, Erlangen (DE); Shubhangi Bhadauria, Erlangen (DE); Mehdi Harounabadi, Erlangen (DE); Dietmar Lipka, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 295 days.

(21) Appl. No.: 18/500,980

(22) Filed: Nov. 2, 2023

(65) Prior Publication Data

US 2024/0064849 A1 Feb. 22, 2024

Related U.S. Application Data

(63) Continuation of application No. PCT/EP2022/062275, filed on May 6, 2022.

(30) Foreign Application Priority Data

May 6, 2021 (EP) .................................... 21172492

(51) Int. Cl.
*H04W 76/23* (2018.01)
*H04W 76/28* (2018.01)
*H04W 92/18* (2009.01)

(52) U.S. Cl.
CPC .......... *H04W 76/23* (2018.02); *H04W 76/28* (2018.02); *H04W 92/18* (2013.01)

(58) Field of Classification Search
CPC ..... H04W 76/23; H04W 76/28; H04W 92/18; H04W 52/0216; H04W 88/04;
(Continued)

(56) References Cited

U.S. PATENT DOCUMENTS

| | | | | |
|---|---|---|---|---|
| 2014/0247742 | A1 | 9/2014 | Lee et al. | |
| 2021/0051587 | A1 * | 2/2021 | Wu .................. | H04W 52/0235 |

(Continued)

FOREIGN PATENT DOCUMENTS

| | | | |
|---|---|---|---|
| CN | 111800894 | A | 10/2020 |
| CN | 112543442 | A | 3/2021 |
| WO | 2021052424 | A1 | 3/2021 |

OTHER PUBLICATIONS

3GPP TS 38.213, V16.5.0 (Mar. 2021), Physical layer procedures for control (Release 16) (183 pages).

(Continued)

*Primary Examiner* — Afshawn M Towfighi
(74) *Attorney, Agent, or Firm* — ASHURST PERKINS COIE US LLP; Michael A. Glenn

(57) ABSTRACT

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to adjust, modify or stop an inactivity timer of the discontinuous reception, DRX, mode of operation in dependence on an operating parameter of the user (Continued)

equipment, UE, [e.g., describing an operating condition of the transceiver and/or operating scenario of the transceiver].

16 Claims, 9 Drawing Sheets

(58) Field of Classification Search
CPC . H04W 52/0261; H04W 72/25; H04W 72/56; Y02D 30/70
See application file for complete search history.

(56) References Cited

U.S. PATENT DOCUMENTS

| | | | | |
|---|---|---|---|---|
| 2021/0059005 | A1* | 2/2021 | Hosseini | H04W 76/28 |
| 2022/0104180 | A1* | 3/2022 | Yang | H04L 5/005 |
| 2022/0174781 | A1 | 6/2022 | Yang et al. | |
| 2023/0247550 | A1* | 8/2023 | Yu | H04W 52/0216 370/311 |

OTHER PUBLICATIONS

3GPP TS 38.214, V16.5.0 (Mar. 2021), Physical layer procedures for data (Release 16) (171 pages).
3GPP TSG RAN WG1 Meeting #100-e, R1-2000151, e-Meeting, Feb. 24-Mar. 6, 2020 MCC Support, Final Report of 3GPP TSG RAN WG1 #99 v1.0.0 (Reno, USA, Nov. 18-22, 2019) (163 pages).
ETSI TS 138 321 V16.4.0 (Apr. 2021), NR Medium Access Control (MAC) protocol specification, chapter 5.7 Release 16 (159 pages).
Sidelink Resource Allocation Mechanism for NR V2X, Qualcomm Incorporated, R1-2000963, 3GPP TSG RAN WG1 Meeting #100-e, Feb. 24-Mar. 6, 2020 (11 pages).
Lenovo et al: "Discontinuous reception and transmission in SL", 3GPP Draft; R2-2009696, 3rd Generation Partnership Project (3GPP), Mobile Competence Centre;650, Route Des Lucioles ; F-06921 Sophia-Antipolis Cedex ; France vol. RAN WG2, No. electronic; Nov. 2, 2020-Nov. 13, 2020 Oct. 22, 2020 (Oct. 22, 2020), XP051941351 (8 pages).
LG Electronics: "Discussion on physical layer design considering sidelink DRX operation", 3GPP Draft; R1-2007897, 3rd Generation Partnership Project (3GPP), Mobile Competence Centre ; 650, Route Des Lucioles ; F-06921 Sophia-Antipolis Cedex ; France vol. RAN WG1, No. E-Meeting; Oct. 26, 2020-Nov. 13, 2020 Oct. 24, 2020 (Oct. 24, 2020), XP051946545, (15 pages).
Intel Corporation: "On general sidelink DRX design", 3GPP Draft; R2-2100622, 3rd Generation Partnership Project (3GPP), Mobile Competence Centre; 650, Route Des Lucioles ; F-06921 Sophia-Antipolis Cedex ; France vol. RAN WG2, No. Electronic meeting: Jan. 25, 2021-Feb. 5, 2021 Jan. 15, 2021 (Jan. 15, 2021), XP051973746 (4 pages).
Vivo: "Coordination between UU and SL DRX", 3GPP Draft; R2-2100797, 3rd Generation Partnership Project (3GPP), Mobile Competence Centre ; 650, Route Des Lucioles ; F-06921 Sophia-Antipolis Cedex; France vol. RAN WG2, No. electronic; Jan. 25, 2021-Feb. 5, 2021 Jan. 15, 2021 (Jan. 15, 2021), XP051973904, (4 pages).
Samsung: "Alignment of wake-up time between TX and RX UEs", 3GPP Draft; R2-2101331, 3rd Generation Partnership Project (3GPP), Mobile Competence Centre ; 650, Route Des Lucioles ; F-06921 Sophia-Antipolis Cedex;France vol. RAN WG2, No. e-Meeting; Jan. 25, 2021-Feb. 5, 2021 Jan. 15, 2021 (Jan. 15, 2021), XP051974261 (2 pages).
LG Electronics, Discussion on physical layer design considering sidelink DRX operation[online], 3GPP TSG RAN WG1 #103-e, 3GPP, Nov. 13, 2020, R1-2007897,, [Searched Date: Oct. 4, 2024], Internet: URL:https://www.3gpp.org/ftp/tsg_ran/WG1_RL1/TSGR1_103-e/Docs/R1-2007897.zip—16 pages.
Huawei, HiSilicon, DRX configuration in NR[online], 3GPP TSG RAN WG2 adhoc_2017_06_NR, 3GPP, Jun. 30, 2017, R2-1706474, [Searched Date: Oct. 4, 2024],, Internet: <URL:http://www.3gpp.org/ftp/tsg_ran/WG2_RL2/TSGR2_AHs/2017_06_NR/Docs/R2-1706474.zip>—7 pages.
Qualcomm Incorporated, On Wake-up alignment between Tx and Rx UEs[online], 3GPP TSG RAN WG2 #113-e, 3GPP, Feb. 5, 2021,, R2-2101246, [Searched Date: Oct. 4, 2024], Internet: URL:https://www.3gpp.org/ftp/tsg_ran/WG2_RL2/TSGR2_113-e/Docs/R2-2101246.zip—6 pages.

* cited by examiner

METHODS FOR OPERATING MODES FOR SIDELINK DISCONTINUOUS RECEPTION

CROSS-REFERENCE TO RELATED APPLICATIONS

This application is a continuation of copending International Application No. PCT/EP2022/062275, filed May 6, 2022, which is incorporated herein by reference in its entirety, and additionally claims priority from European Application No. 21172492.7, filed May 6, 2021, which is also incorporated herein by reference in its entirety.

TECHNICAL FIELD

Embodiments of the present application relate to the field of wireless communication, and more specifically, to wireless communication between a plurality of user equipments via the sidelink, SL, using a discontinuous reception, DRX, to save energy. Some embodiments relate to L1 & L2 methods for SL DRX.

BACKGROUND OF THE INVENTION

FIG. 1 is a schematic representation of an example of a terrestrial wireless network 100 including, as is shown in FIG. 1(*a*), a core network 102 and one or more radio access networks RAN1, RAN2, . . . RANN. FIG. 1(*b*) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the RANn may include more or less such cells, and RANn may also include only one base station. FIG. 1(*b*) shows two users UE1 and UE2, also referred to as user equipment, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. Further, FIG. 1(*b*) shows two IoT devices 1101 and 1102 in cell 1064, which may be stationary or mobile devices. The IoT device 1101 accesses the wireless communication system via the base station gNB4 to receive and transmit data as schematically represented by arrow 1121. The IoT device 1102 accesses the wireless communication system via the user UE3 as is schematically represented by arrow 1122. The respective base station gNB1 to gNB5 may be connected to the core network 102, e.g., via the S1 interface, via respective backhaul links 1141 to 1145, which are schematically represented in FIG. 1(*b*) by the arrows pointing to "core". The core network 102 may be connected to one or more external networks. Further, some or all of the respective base station gNB1 to gNB5 may connected, e.g., via the S1 or X2 interface or the XN interface in NR, with each other via respective backhaul links 1161 to 1165, which are schematically represented in FIG. 1(*b*) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB), the physical downlink shared channel (PDSCH) carrying for example a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels, or more precisely the transport channels according to 3GPP, may further include the physical random access channel (PRACH or RACH) used by UEs for accessing the network once a UE is synchronized and has obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix (CP) length. All OFDM symbols may be used for DL or UL or only a subset, e.g., when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the NR (5G), New Radio, standard.

The wireless network or communication system depicted in FIG. 1 may by a heterogeneous network having distinct overlaid networks, e.g., a network of macro cells with each macro cell including a macro base station, like base station gNB1 to gNB5, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the NR (5G), new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

Naturally, it is also possible that the first vehicle 202 is covered by the gNB, i.e. connected with Uu to the gNB, wherein the second vehicle 204 is not covered by the gNB and only connected via the PC5 interface to the first vehicle 202, or that the second vehicle is connected via the PC5 interface to the first vehicle 202 but via Uu to another gNB, as will become clear from the discussion of FIGS. 4 and 5.

FIG. 4 is a schematic representation of a scenario in which two UEs directly communicating with each, wherein only one of the two UEs is connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204, wherein only the first vehicle 202 is in the coverage area 200 of the base station gNB. Both vehicles 202, 204 are connected directly with each other over the PC5 interface.

FIG. 5 is a schematic representation of a scenario in which two UEs directly communicating with each, wherein the two UEs are connected to different base stations. The first base station gNB1 has a coverage area that is schematically represented by the first circle 2001, wherein the second station gNB2 has a coverage area that is schematically represented by the second circle 2002. The UEs directly communicating with each other include a first vehicle 202 and a second vehicle 204, wherein the first vehicle 202 is in the coverage area 2001 of the first base station gNB1 and connected to the first base station gNB1 via the Uu interface, wherein the second vehicle 204 is in the coverage area 2002 of the second base station gNB2 and connected to the second base station gNB2 via the Uu interface.

In a wireless communication system as described above, power saving is crucial for battery-driven UEs and DRX on the Uu interface is a method enabling considerable power reduction.

DRX on the Uu interface is specified in 3GPP TS 38.321, NR Medium Access Control (MAC) protocol specification, chapter 5.7. Briefly described, the UE wakes up from a sleep mode regularly and is active for the duration of ongoing traffic. The basic wake-up cycle is called long cycle. Each wake-up the UE is active for at least the so-called "ON-duration". If no data traffic occurs, the UE enters the sleep state after the configured ON-duration. For ongoing traffic, the active time is prolonged by virtue of a so-called "inactivity time" that (re-)starts at each slot where a transport block arrives or shall be transmitted.

To allow sleep mode even between HARQ retransmissions a HARQ roundtrip timer and retransmission timer is used. The roundtrip timer starts when a NACK is transmitted and stops after the minimum time after the next retransmission may occur. The retransmission timer is started when the roundtrip timer stops and stops when the maximum waiting time for a retransmission is reached.

If configured, a short DRX cycle can be started after the ON-duration. The short DRX cycle is a wake-up in shorter periods nested between the active durations of the long cycle. FIG. 6 shows an example of the timing of long and short DRX cycle (Source: Sharetechnote, https://www.sharetechnote.com/html/Handbook_LTE_DRX.html).

Starting from the above, there is a need for improvements or enhancements with respect to communication reliability and/or power consumption, especially for battery powered UEs.

It is noted that the information in the above section is only for enhancing the understanding of the background of the invention and therefore it may contain information that does not form prior art and is already known to a person of ordinary skill in the art.

SUMMARY

An embodiment may have a user equipment, UE, of a wireless communication system, wherein the user equipment, UE, is configured to operate in new radio sidelink mode 1, wherein the user equipment, UE, is configured to receive, in the sidelink scenario, sidelink transmissions using a discontinuous reception, DRX, mode of operation, wherein the user equipment, UE, is configured to adjust, modify or stop an inactivity timer of the discontinuous reception, DRX, mode of operation in dependence on an operating parameter of the user equipment, UE, wherein the user equipment, UE, is configured to communicate in the new radio sidelink mode 1 with a group of other user equipments, UEs, wherein the user equipment, UE is configured to receive from a base station, gNB, of the wireless communication system a discontinuous reception, DRX, configuration information and to adjust at least one parameter of the discontinuous reception, DRX, mode of operation in dependence on the discontinuous reception, DRX, configuration information, wherein the user equipment, UE, is configured to transmit to one or more other UEs of the group of other UEs, that are operating in a new radio sidelink mode 2, the discontinuous reception, DRX, configuration information.

According to another embodiment, a method for operating a user equipment, UE, of a wireless communication system may have the steps of: operating the user equipment, UE, in a new radio sidelink mode 1, receiving with the user equipment, UE, in the sidelink scenario, sidelink transmissions using a discontinuous reception, DRX, mode of operation, adjusting, modifying or stopping an inactivity timer of the discontinuous reception, DRX, mode of operation in dependence on an operating parameter of the user equipment, UE, communicating in the new radio sidelink mode 1 with a group of other user equipments, UEs, receiving from a base station, gNB, of the wireless communication system a discontinuous reception, DRX, configuration information and adjusting at least one parameter of the discontinuous reception, DRX, mode of operation in dependence on the discontinuous reception, DRX, configuration information, transmitting to one or more other UEs of the group of other UEs, that are operating in a new radio sidelink mode 2, the discontinuous reception, DRX, configuration information.

Another embodiment may have a non-transitory digital storage medium having stored thereon a computer program for performing a method for operating a user equipment, UE, of a wireless communication system having the steps of: operating the user equipment, UE, in a new radio sidelink mode 1, receiving with the user equipment, UE, in the sidelink scenario, sidelink transmissions using a discontinuous reception, DRX, mode of operation, adjusting, modifying or stopping an inactivity timer of the discontinuous reception, DRX, mode of operation in dependence on an operating parameter of the user equipment, UE, communicating in the new radio sidelink mode 1 with a group of other user equipments, UEs, receiving from a base station, gNB, of the wireless communication system a discontinuous reception, DRX, configuration information and adjusting at least one parameter of the discontinuous reception, DRX, mode of operation in dependence on the discontinuous reception, DRX, configuration information, transmitting to one or more other UEs of the group of other UEs, that are operating in a new radio sidelink mode 2, the discontinuous reception, DRX, configuration information, when the computer program is run by a computer.

BRIEF DESCRIPTION OF THE DRAWINGS

Embodiments of the present invention are described herein making reference to the appended drawings, in which.

DETAILED DESCRIPTION OF THE INVENTION

Figure 1A:
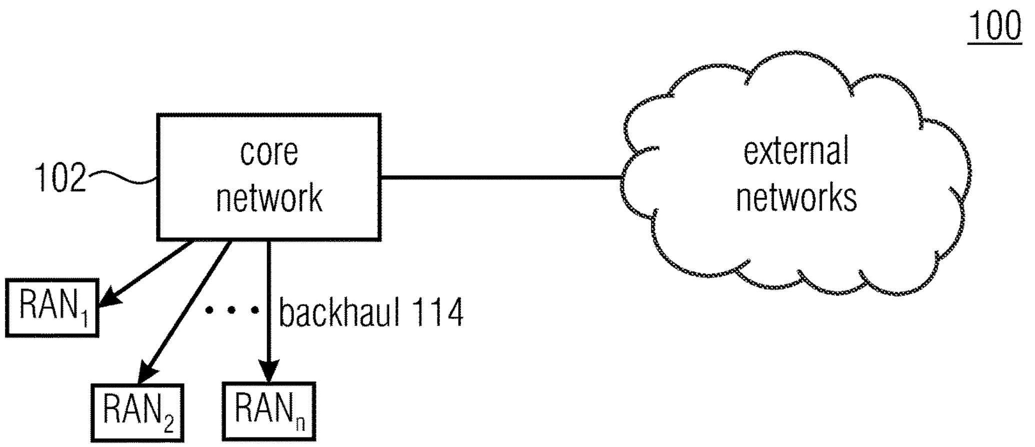
FIG. 1*a-b* shows a schematic representation of an example of a wireless communication system.
Figure 1B:
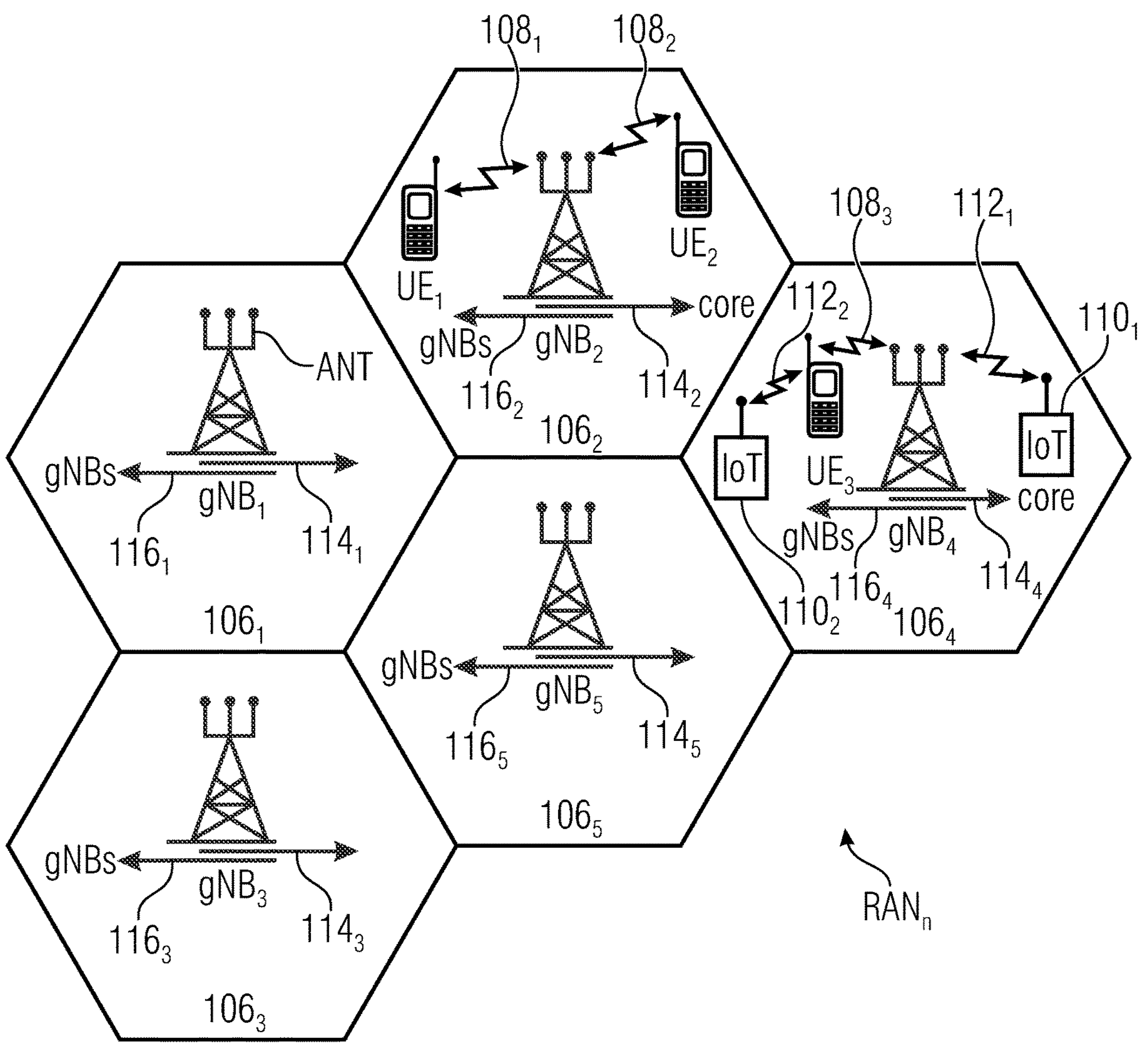
Figure 2:
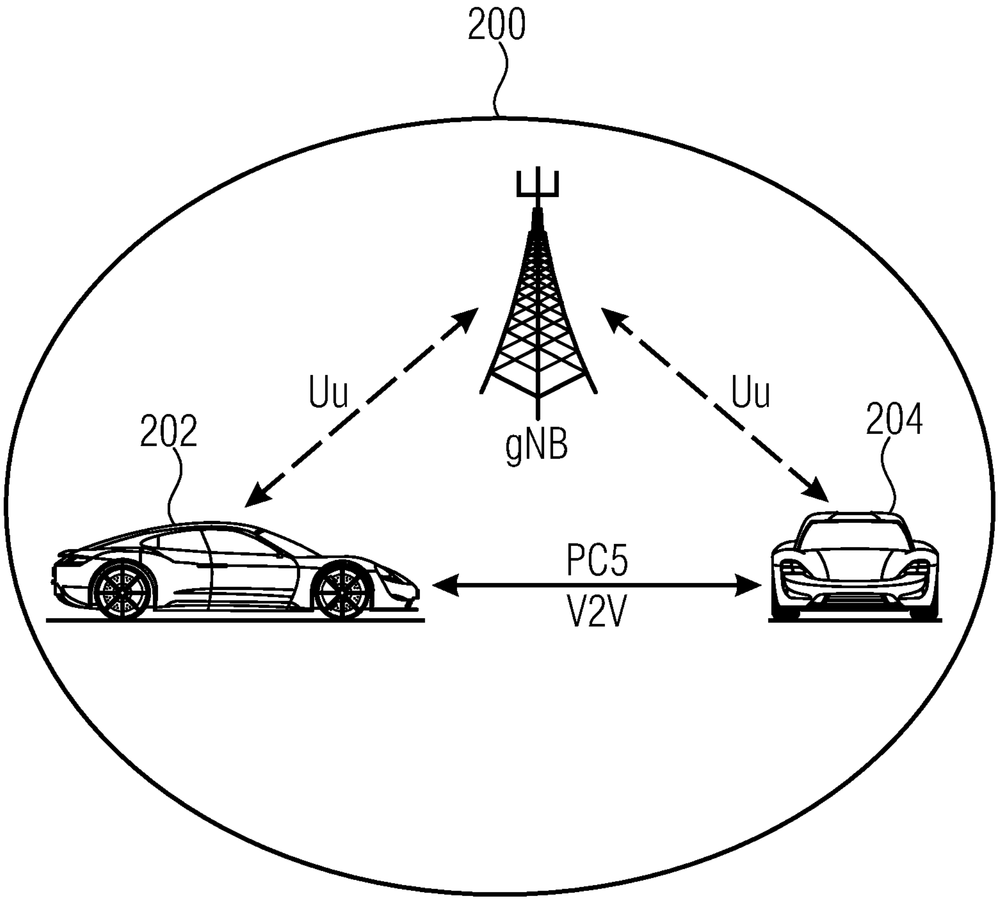
FIG. 2 is a schematic representation of an in-coverage scenario in which UEs directly communicating with each other are connected to a base station.
Figure 3:
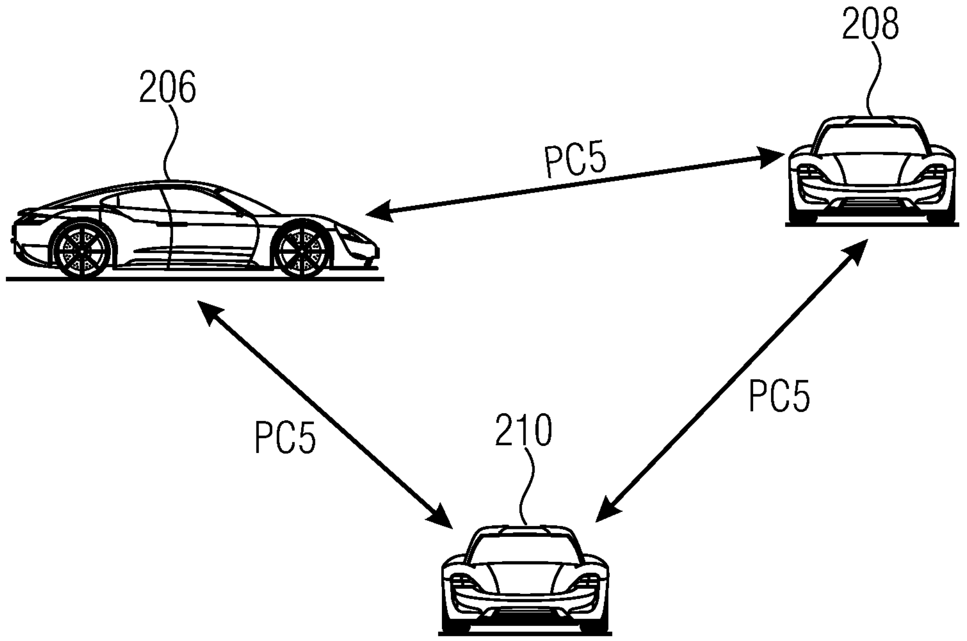
FIG. 3 is a schematic representation of an out-of-coverage scenario in which UEs directly communicating with each other receive no SL resource allocation configuration or assistance from a base station.
Figure 4:
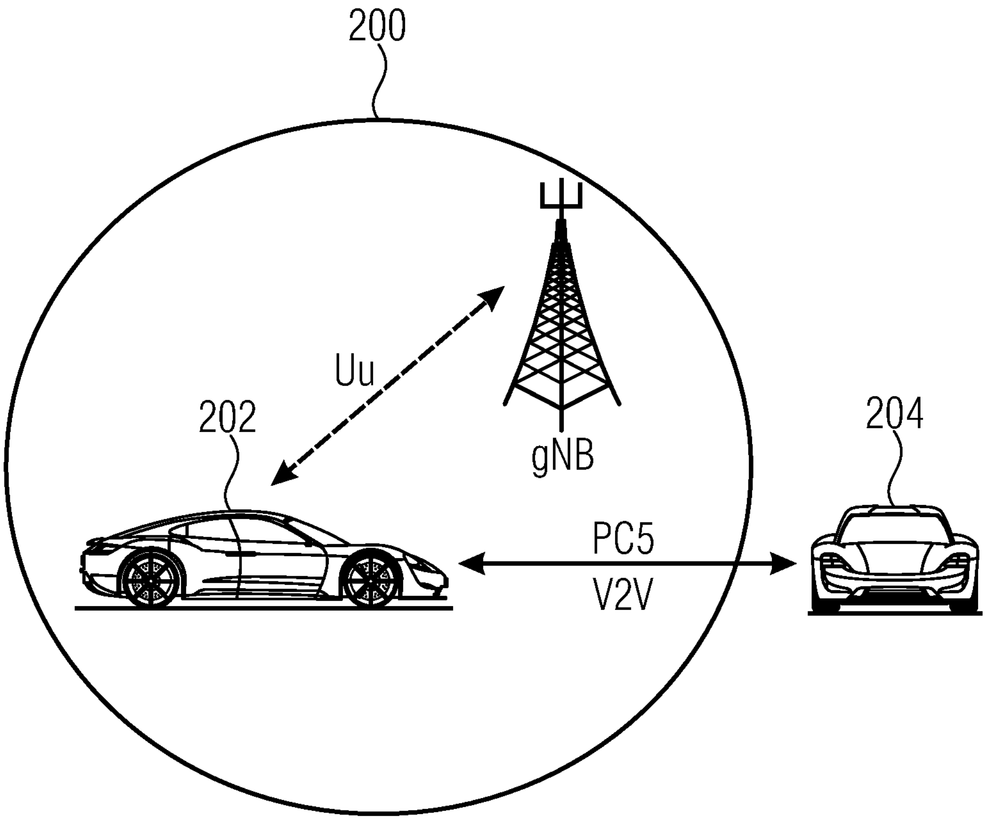
FIG. 4 is a schematic representation of a partial out-of-coverage scenario in which some of the UEs directly communicating with each other receive no SL resource allocation configuration or assistance from a base station.
Figure 5:
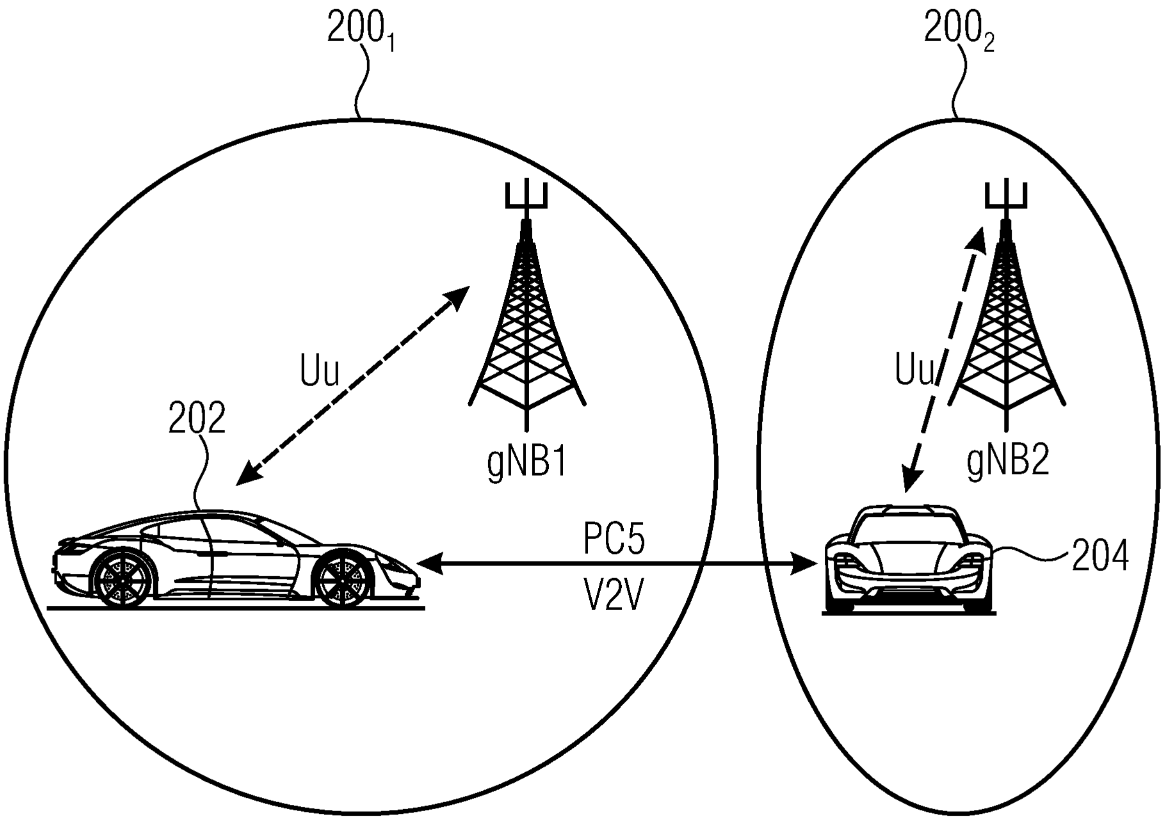
FIG. 5 is a schematic representation of an in-coverage scenario in which UEs directly communicating with each other are connected to different base stations.
Figure 6:
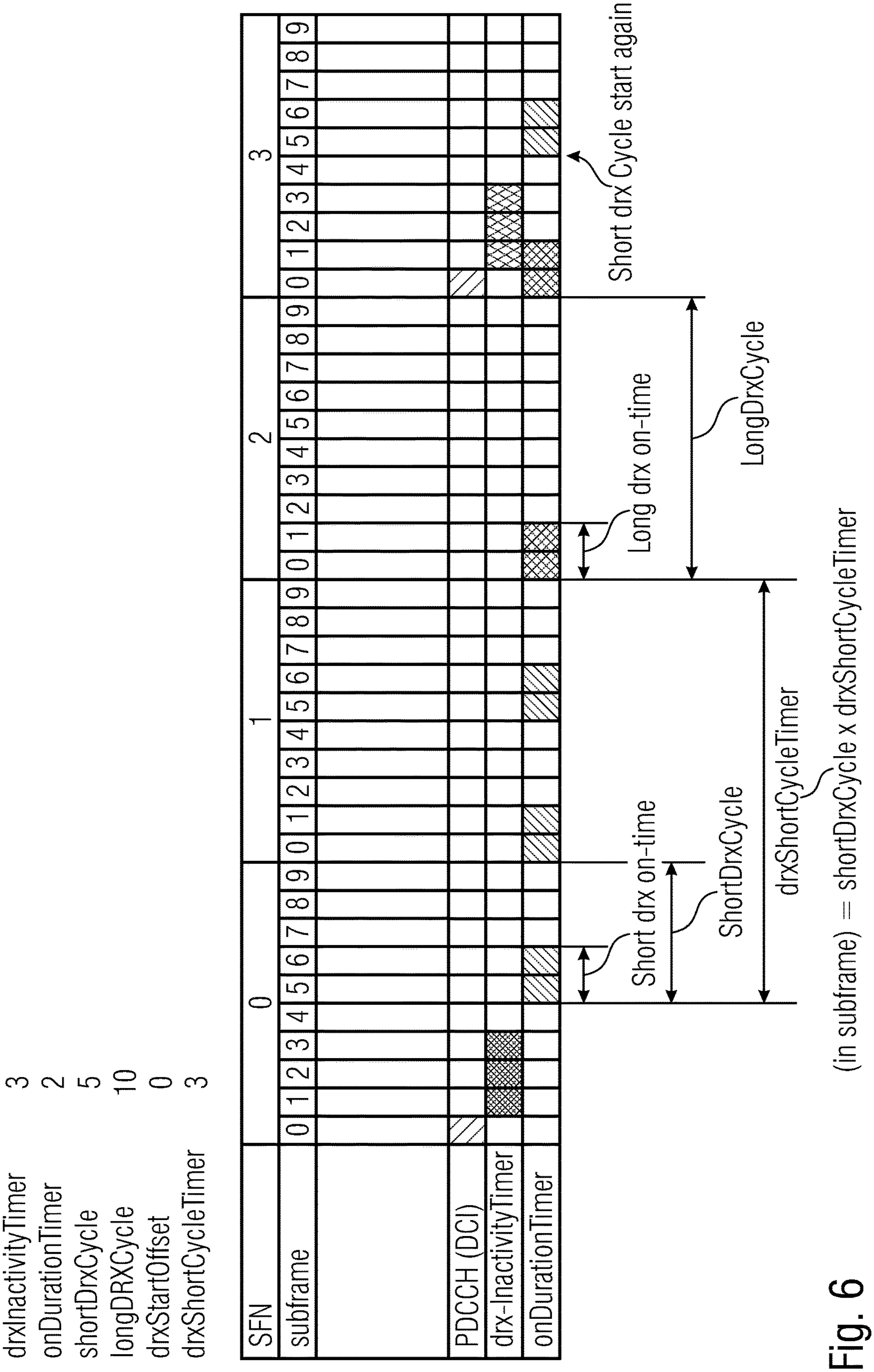
FIG. 6 shows in a diagram a schematic representation of DRX timing on the Uu interface.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 7:
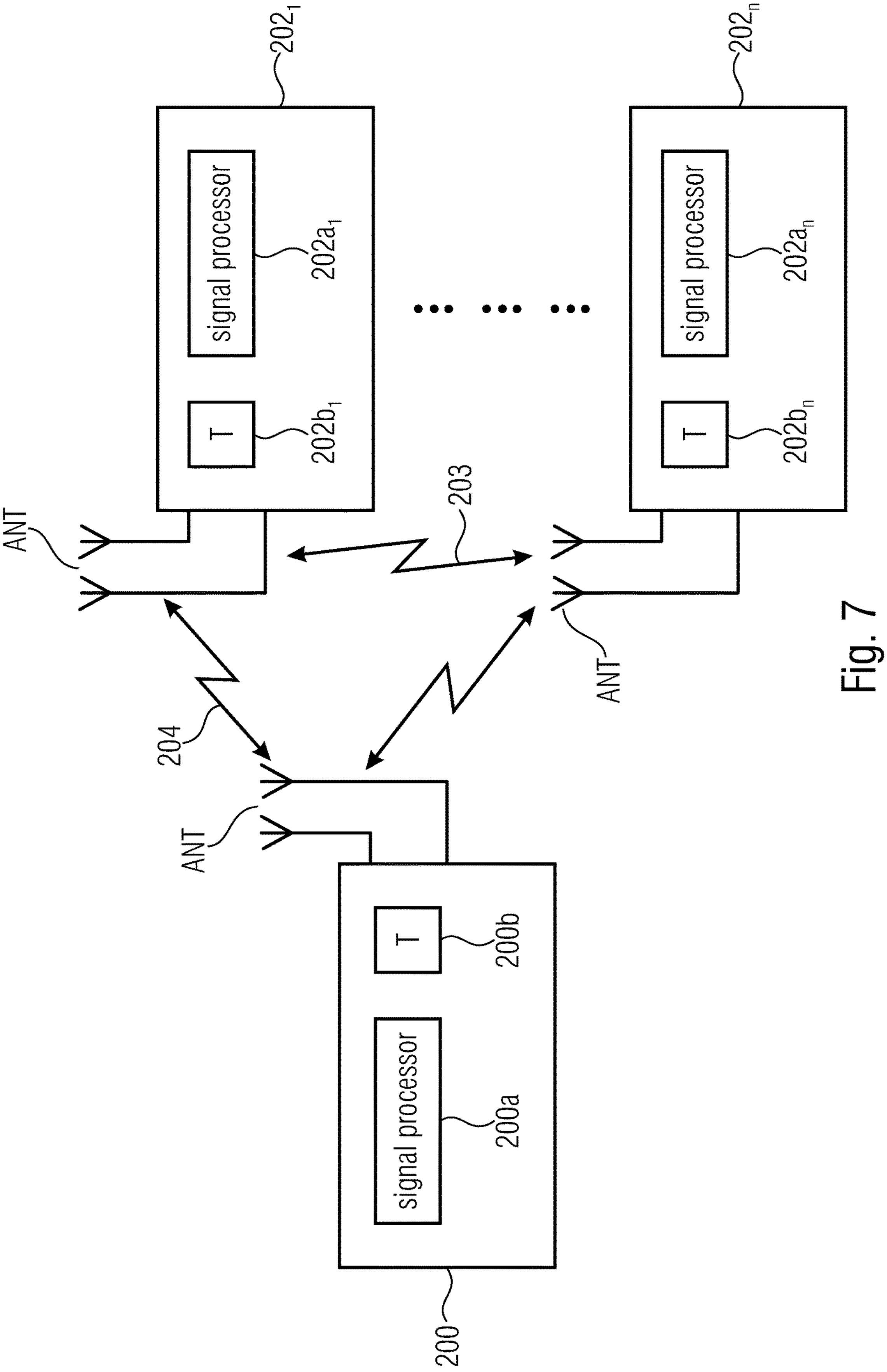
FIG. 7 is a schematic representation of a wireless communication system comprising a transceiver, like a base station or a relay, and a plurality of communication devices, like UEs.

Embodiments of the present invention may be implemented in a wireless communication system or network as depicted in FIGS. 1 to 5 including a transceiver, like a base station, gNB, or relay, and a plurality of communication devices, like user equipment's, UEs. FIG. 7 is a schematic representation of a wireless communication system comprising a transceiver 200, like a base station or a relay, and a plurality of communication devices $\mathbf{202}_1$ to $\mathbf{202}_n$, like UEs. The UEs might communicated directly with each other via a wireless communication link or channel 203, like a radio link (e.g., using the PC5 interface (sidelink)). Further, the transceiver and the UEs 202 might communicate via a wireless communication link or channel 204, like a radio link (e.g., using the uU interface). The transceiver 200 might include one or more antennas ANT or an antenna array having a plurality of antenna elements, a signal processor 200*a* and a transceiver unit 200*b*. The UEs 202 might include one or more antennas ANT or an antenna array having a plurality of antennas, a signal processor 202*a*1 to 202*an*, and a transceiver unit 202*b*1 to 202*bn*. The base station 200 and/or the one or more UEs 202 may operate in accordance with the inventive teachings described herein.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to adjust, modify or stop an inactivity timer of the discontinuous reception, DRX, mode of operation in dependence on an operating parameter of the user equipment, UE, [e.g., describing an operating condition of the transceiver and/or operating scenario of the transceiver].

In embodiments, the operating parameter is one out of a successful sidelink data reception or data transmission, a failure scenario, a reception of a new DRX command.

Embodiments provide a user equipment, UE, of a wireless communication system [e.g., new radio, NR/5G], wherein the user equipment, UE, is configured to operate in a sidelink in coverage scenario [e.g., NR sidelink mode 1], wherein the user equipment, UE, is configured to communicate in the sidelink in coverage scenario with a group of other user equipments, UEs, wherein the user equipment, UE, is configured to receive, in the sidelink scenario sidelink transmissions from one or more other UEs of the group of other UEs using a discontinuous reception, DRX, mode of operation [e.g., in on-periods of the DRX mode of operation], wherein the user equipment, UE is configured to receive from a base station, gNB, of the wireless communication system a discontinuous reception, DRX, configuration information and to adjust at least one parameter of the discontinuous reception, DRX, mode of operation in dependence on the discontinuous reception, DRX, configuration information, wherein the user equipment, UE, is configured to transmit to one or more other UEs of the group of other UEs, that are operating in a sidelink out of coverage scenario [e.g., NR sidelink mode 2], the discontinuous reception, DRX, configuration information.

Embodiments provide a user equipment, UE, of a wireless communication system [e.g., new radio, NR/5G], wherein the user equipment, UE, is configured to operate in a sidelink out of coverage scenario [e.g., NR sidelink mode 2], wherein the user equipment, UE, is configured to communicate in the sidelink out of coverage scenario with a group of other user equipments, UEs, wherein the user equipment, UE, is configured to receive, in the sidelink scenario sidelink transmissions from one or more other UEs of the group of other UEs using a discontinuous reception, DRX, mode of operation [e.g., in on-periods of the DRX mode of operation], wherein the user equipment, UE is configured to receive from another user equipment of the group of user equipments, UEs, a discontinuous reception, DRX, configuration information and to adjust at least one parameter of the discontinuous reception, DRX, mode of operation in dependence on the discontinuous reception, DRX, configuration information.

Embodiments provide a user equipment, UE, of a wireless communication system [e.g., new radio, NR/5G], wherein the user equipment, UE, is configured to operate in a sidelink scenario, wherein the user equipment, UE, is configured to communicate in the sidelink scenario with a group of other user equipments, UEs, wherein the user equipment, UE, is configured to receive, in the sidelink scenario sidelink transmissions from one or more other UEs of the group of other UEs using a discontinuous reception, DRX, mode of operation [e.g., in on-periods of the DRX mode of operation], wherein the user equipment, UE is configured to change/switch from a sidelink out of coverage scenario [e.g., NR sidelink mode 2] to a sidelink in coverage scenario [e.g., NR sidelink mode 1], wherein the user equipment, UE is configured, in the sidelink in coverage scenario, to transmit to a base station, gNB, of the wireless communication system a discontinuous reception, DRX, configuration information describing the discontinuous reception, DRX, mode of operation used by the user equipment, UE, and/or the group of other user equipments, UEs.

Embodiments provide a base station, gNB, of a wireless communication system [e.g., new radio, NR/5G], wherein the base station, gNB, is configured to receive from an user equipment of a group of user equipments of the wireless communication system a system a discontinuous reception, DRX, configuration information describing the discontinuous reception, DRX, mode of operation used by the group of user equipments, UEs, wherein the base station, gNB, is configured to perform communications [e.g., transmissions and/or receptions] with one or more user equipments, UEs, of the group of user equipments in on-periods of the discontinuous reception, DRX, mode of operation used by the group of user equipments, UEs, described by the discontinuous reception, DRX, configuration information.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario with a plurality of other user equipments, UEs, using a discontinuous reception, DRX, mode of operation [e.g., in on periods of the DRX mode of operation], wherein the plurality of other user equipments, UEs, use different discontinuous reception, DRX, configurations [e.g., for different services] associated with different priorities and/or QoS requirements for different services, wherein the user equipment, UE, is configured to adapt/adjust its discontinuous reception, DRX, configuration in dependence on one or more selected discontinuous reception, DRX, configurations, selected out of the different discontinuous reception, DRX, configurations used by the plurality of other user equipments, UEs.

In embodiments, the user equipment, UE, is configured to select one or more discontinuous reception, DRX, configurations out of the different discontinuous reception, DRX, configurations based on an operating parameter of the user equipment, UE, wherein the operating parameter of the user equipment, UE, is a battery level of the user equipment, UE, or a QoS requirement [e.g., priority associated with a service].

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on periods of the DRX mode of operation], from at least two other user equipments, UEs, the at least two other user equipments, UEs, using different discontinuous reception, DRX, configurations [e.g., different DRX patterns], wherein a discontinuous reception, DRX, configuration [e.g., DRX pattern] used by the user equipment in the discontinuous reception, DRX, mode of operation is adjusted to the different discontinuous reception, DRX, configurations [e.g., different DRX patterns] used by at least two other user equipments, UEs.

In embodiments, the discontinuous reception, DRX, configuration [e.g., DRX pattern] of the user equipment is adjusted to the different discontinuous reception, DRX, configurations such that on periods of the discontinuous reception, DRX, configuration of the user equipment match on periods of more than one or all of the different discontinuous reception, DRX, configurations.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario, a discontinuous reception, DRX, configuration information [e.g., carried in a sidelink control information] describing the discontinuous reception, DRX, mode of operation used by another user equipment, UE, of the wireless communication network, wherein the user equipment, UE, is configured to receive the discontinuous reception, DRX, configuration information using one out of

- a non-discontinuous reception, DRX, mode of operation,
- a discontinuous reception, DRX, mode of operation with a standard/preconfigured discontinuous reception, DRX, configuration [e.g., DRX pattern],
- a uU interface in case of an sidelink in-coverage scenario, wherein the user equipment is configured to at least one out of

- adjust/modify its discontinuous reception, DRX, configuration in accordance with the received discontinuous reception, DRX, configuration information,
- update a device list by storing the received discontinuous reception, DRX, configuration information together with an indication of the other user equipment in the device list.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario sidelink control information, SCI, [e.g., carrying resource reservation information] from at least one other user equipment, UE, of the wireless communication network using a discontinuous reception, DRX, mode of operation [e.g., in on-periods of the DRX mode of operation], wherein the user equipment, UE, is configured to derive a sensing information from the sidelink control information, SCI, the sensing information describing an occupancy of a sidelink resource pool.

In embodiments, the user equipment is configured to derive the sensing information from the sidelink control information by decoding the sidelink control information [e.g., instead of performing a separate partial sensing].

In embodiments, the user equipment, UE, is configured to determine a set of candidate resources for a sidelink transmission based on the sensing information, wherein the user equipment, UE, is configured to perform the sidelink transmission in one or more selected resources selected out of the set of candidate resources.

In embodiments, the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to receive sidelink control information only for a predefined time period [e.g., a defined number of slots, e.g., one or two slots, or up to 32 slots] prior to the on-duration of the discontinuous reception, DRX, mode of operation.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to transmit sidelink control information carrying a resource reservation information indicating one or more resources reserved by the user equipment, UE, for a sidelink transmission, wherein user equipment is configured, in case that at least one of the one or more resources reserved by the user equipment, UE, are located within an on-period of the discontinuous reception, DRX, mode of operation of the other user equipments, UEs, to transmit the sidelink control information only in an on-period of the discontinuous reception, DRX, mode of operation of the other user equipments, wherein user equipment is configured, in case that at least one of the one or more resources reserved by the user equipment, UE, are located within an off-period of the discontinuous reception, DRX, mode of operation of the other user equipments, UEs, to transmit the sidelink control information in an off-period of the discontinuous reception, DRX, mode of operation of the other user equipments.

In embodiments, the user equipment, UE, is configured to only determine those resources as the set of candidate resources or to only select those resources out of the set of candidate resources that fall within an on-period of the discontinuous reception, DRX, mode of operation.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to align on-periods and/or a cycle of the discontinuous reception, DRX, mode of operation in accordance with period traffic.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario with one or more other user equipments, UEs, using a discontinuous reception, DRX, mode of operation [e.g., in on-periods of the DRX mode of operation], wherein the user equipment, UE, comprise a queue for sidelink transmissions sorted according to priorities or quality of service requirements, wherein the user equipment, UE, is configured to modify the queue for the sidelink transmissions in case that a currently pending sidelink transmission is addressed to a user equipment that is currently in a discontinuous reception, DRX, off period, and to rather transmit a sidelink transmission to another user equipment that is currently in a discontinuous reception, DRX, on period.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to transmit or receive during an on-period of the a discontinuous reception, DRX, mode of operation a communication request to or from another user equipment, UE, of the wireless communication network, the communication request requesting a communication during an off-period of the discontinuous reception, DRX, mode of operation, wherein the user equipment, UE, is configured to communicate with the other user equipment, UE, during an off-period of the discontinuous reception, DRX, mode of operation in accordance with the communication request.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to transmit a resource reservation information [e.g., a sidelink control information carrying the resource reservation information] during an on-period of the discontinuous reception, DRX, mode of operation, wherein the user equipment is configured to transmit the resource reservation information during the on-period at a random time [e.g., random slot].

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to receive a resource reservation information [e.g., a sidelink control information carrying the resource reservation information] during an on-period of the discontinuous reception, DRX, mode of operation, wherein the user equipment, UE, is configured to one out of adjust an inactivity timer of the discontinuous reception, DRX, mode of operation in dependence on the resource reservation information [e.g., in order to receive a sidelink transmission indicated by the resource reservation information]

restart an inactivity timer of the discontinuous reception, DRX, mode of operation in dependence on the resource reservation information [e.g., in order to receive a sidelink transmission indicated by the resource reservation information].

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario [e.g., from another UE of the wireless communication system], with a group of other user equipments, UEs, using a discontinuous reception, DRX, mode of operation [e.g., in on-periods of the DRX mode of operation], wherein the user equipment, UE, is configured to detect a mismatch between a discontinuous reception, DRX, configuration used by the user equipment, UE, and a discontinuous reception, DRX, configuration used by the group of other user equipments, UEs, wherein the user equipment, UE, is configured to switch, in response to the detection of the mismatch between the discontinuous reception, DRX, configuration used by the user equipment, UE, and the discontinuous reception, DRX, configuration used by the group of other user equipments, UEs, into one out of following a non-discontinuous reception, DRX, mode of operation a discontinuous reception, DRX, mode of operation with a standard/preconfigured discontinuous reception, DRX, configuration [e.g., DRX pattern]

in order to receive a discontinuous reception, DRX, configuration information from the group of other user equipments, UEs.

Embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to adjust, modify or stop an inactivity timer of the discontinuous reception, DRX, mode of operation in dependence on an operating parameter of the user equipment, UE, [e.g., describing an operating condition of the transceiver and/or operating scenario of the transceiver].

In embodiments, the operating parameter is one out of a successful sidelink data reception or data transmission, a failure scenario, a reception of a new DRX command.

In embodiments, the user equipment, UE, is configured to operate in a sidelink in coverage scenario [e.g., NR sidelink mode 1], wherein the user equipment, UE, is configured to communicate in the sidelink in coverage scenario with a group of other user equipments, UEs, wherein the user equipment, UE is configured to receive from a base station, gNB, of the wireless communication system a discontinuous reception, DRX, configuration information and to adjust at least one parameter of the discontinuous reception, DRX, mode of operation in dependence on the discontinuous reception, DRX, configuration information, wherein the user equipment, UE, is configured to transmit to one or more other UEs of the group of other UEs, that are operating in a sidelink out of coverage scenario [e.g., NR sidelink mode 2], the discontinuous reception, DRX, configuration information.

In embodiments, the user equipment, UE, is configured to operate in a sidelink out of coverage scenario [e.g., NR sidelink mode 2], wherein the user equipment, UE, is configured to communicate in the sidelink out of coverage scenario with a group of other user equipments, UEs, wherein the user equipment, UE, is configured to receive, in the sidelink out of coverage scenario sidelink transmissions from one or more other UEs of the group of other UEs using a discontinuous reception, DRX, mode of operation [e.g., in on-periods of the DRX mode of operation], wherein the user equipment, UE is configured to receive from another user equipment of the group of user equipments, UEs, a discontinuous reception, DRX, configuration information and to adjust at least one parameter of the discontinuous reception, DRX, mode of operation in dependence on the discontinuous reception, DRX, configuration information.

In embodiments, the user equipment, UE, is configured to communicate in the sidelink scenario with a group of other user equipments, UEs, wherein the user equipment, UE, is configured to receive, in the sidelink scenario sidelink transmissions from one or more other UEs of the group of other UEs using the discontinuous reception, DRX, mode of operation [e.g., in on-periods of the DRX mode of operation], wherein the user equipment, UE, is configured to change/switch from the sidelink out of coverage scenario [e.g., NR sidelink mode 2] to the sidelink in coverage scenario [e.g., NR sidelink mode 1], wherein the user equipment, UE is configured, in the sidelink in coverage scenario, to transmit to a base station, gNB, of the wireless communication system a discontinuous reception, DRX, configuration information describing the discontinuous reception, DRX, mode of operation used by the user equipment, UE, and/or the group of other user equipments, UEs.

In embodiments, the user equipment, UE, is configured to receive sidelink transmissions using the discontinuous reception, DRX, mode of operation [e.g., in on periods of the DRX mode of operation], from at least two other user equipments, UEs, the at least two other user equipments, UEs, using different discontinuous reception, DRX, configurations [e.g., different DRX patterns], wherein a discontinuous reception, DRX, configuration [e.g., DRX pattern] used by the user equipment in the discontinuous reception, DRX, mode of operation is adjusted to the different discontinuous reception, DRX, configurations [e.g., different DRX patterns] used by at least two other user equipments, UEs.

In embodiments, the discontinuous reception, DRX, configuration [e.g., DRX pattern] of the user equipment is adjusted to the different discontinuous reception, DRX, configurations such that on periods of the discontinuous reception, DRX, configuration of the user equipment match on periods of more than one or all of the different discontinuous reception, DRX, configurations.

In embodiments, the user equipment, UE, is configured to receive, in the sidelink scenario, a discontinuous reception, DRX, configuration information [e.g., carried in a sidelink control information] describing the discontinuous reception, DRX, mode of operation used by another user equipment, UE, of the wireless communication network, wherein the user equipment, UE, is configured to receive the discontinuous reception, DRX, configuration information using one out of a non-discontinuous reception, DRX, mode of operation, a discontinuous reception, DRX, mode of operation with a standard/preconfigured discontinuous reception, DRX, configuration [e.g., DRX pattern], a uU interface in case of an sidelink in-coverage scenario, wherein the user equipment is configured to at least one out of adjust/modify its discontinuous reception, DRX, configuration in accordance with the received discontinuous reception, DRX, configuration information, update a device list by storing the received discontinuous reception, DRX, configuration information together with an indication of the other user equipment in the device list.

In embodiments, the user equipment, UE, is configured to receive, in the sidelink scenario sidelink control information, SCI, [e.g., carrying resource reservation information] from at least one other user equipment, UE, of the wireless communication network using a discontinuous reception, DRX, mode of operation [e.g., in on-periods of the DRX mode of operation], wherein the user equipment, UE, is configured to derive a sensing information from the sidelink control information, SCI, the sensing information describing an occupancy of a sidelink resource pool.

In embodiments, the user equipment is configured to derive the sensing information from the sidelink control information by decoding the sidelink control information [e.g., instead of performing a separate partial sensing].

In embodiments, the user equipment, UE, is configured to determine a set of candidate resources for a sidelink transmission based on the sensing information, wherein the user equipment, UE, is configured to perform the sidelink transmission in one or more selected resources selected out of the set of candidate resources.

In embodiments, the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to receive sidelink control information only for a predefined time period [e.g., a defined number of slots, e.g., one or two slots, or up to 32 slots] prior to the on-duration of the discontinuous reception, DRX, mode of operation.

In embodiments, the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to transmit sidelink control information carrying a resource reservation information indicating one or more resources reserved by the user equipment, UE, for a sidelink transmission, wherein user equipment is configured, in case that at least one of the one or more resources reserved by the user equipment, UE, are located within an on-period of the discontinuous reception, DRX, mode of operation of the other user equipments, UEs, to transmit the sidelink control information only in an on-period of the discontinuous reception, DRX, mode of operation of the other user equipments, wherein user equipment is configured, in case that at least one of the one or more resources reserved by the user equipment, UE, are located within an off-period of the discontinuous reception, DRX, mode of operation of the other user equipments, UEs, to transmit the sidelink control information in an off-period of the discontinuous reception, DRX, mode of operation of the other user equipments.

In embodiments, the user equipment, UE, is configured to only determine those resources as the set of candidate resources or to only select those resources out of the set of candidate resources that fall within an on-period of the discontinuous reception, DRX, mode of operation.

In embodiments, the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to align on-periods and/or a cycle of the discontinuous reception, DRX, mode of operation in accordance with period traffic.

In embodiments, the user equipment, UE, is configured to receive a resource reservation information [e.g., a sidelink control information carrying the resource reservation information] during an on-period of the discontinuous reception, DRX, mode of operation, wherein the user equipment, UE, is configured to one out of

- adjust an inactivity timer of the discontinuous reception, DRX, mode of operation in dependence on the resource reservation information [e.g., in order to receive a sidelink transmission indicated by the resource reservation information]
- restart an inactivity timer of the discontinuous reception, DRX, mode of operation in dependence on the resource reservation information [e.g., in order to receive a sidelink transmission indicated by the resource reservation information].

Further embodiments provide a base station, gNB, of a wireless communication system [e.g., new radio, NR/5G], wherein the base station, gNB, is configured to receive from an user equipment of a group of user equipments of the wireless communication system a system a discontinuous reception, DRX, configuration information describing the discontinuous reception, DRX, mode of operation used by the group of user equipments, UEs, wherein the base station, gNB, is configured to perform communications [e.g., transmissions and/or receptions] with one or more user equipments, UEs, of the group of user equipments in on-periods of the discontinuous reception, DRX, mode of operation used by the group of user equipments, UEs, described by the discontinuous reception, DRX, configuration information.

Further embodiments provide a wireless communication system. The wireless communication system comprises a user equipment and a base station. The user equipment, UE, is configured to operate in a sidelink in-coverage, out of coverage or partial coverage scenario [e.g., NR sidelink mode 1 or mode 2]], wherein the user equipment, UE, is configured to receive, in the sidelink scenario [e.g., from another UE of the wireless communication system], sidelink transmissions using a discontinuous reception, DRX, mode of operation [e.g., in on-periods of the DRX mode of operation], wherein the user equipment, UE, is configured to adjust, modify or stop an inactivity timer of the discontinuous reception, DRX, mode of operation in dependence on an operating parameter of the user equipment, UE, [e.g., describing an operating condition of the transceiver and/or operating scenario of the transceiver], wherein the user equipment, UE, is configured to communicate in the sidelink scenario with a group of other user equipments, UEs, wherein the user equipment, UE, is configured to receive, in the sidelink scenario sidelink transmissions from one or more other UEs of the group of other UEs using the discontinuous reception, DRX, mode of operation [e.g., in on-periods of the DRX mode of operation], wherein the user equipment, UE, is configured to change/switch from the sidelink out of coverage scenario [e.g., NR sidelink mode 2] to the sidelink in coverage scenario [e.g., NR sidelink mode 1], wherein the user equipment, UE is configured, in the sidelink in coverage scenario, to transmit to a base station, gNB, of the wireless communication system a discontinuous reception, DRX, configuration information describing the discontinuous reception, DRX, mode of operation used by the user equipment, UE, and/or the group of other user equipments, UEs. The base station, gNB, is configured to receive from an user equipment of a group of user equipments of the wireless communication system a system a discontinuous reception, DRX, configuration information describing the discontinuous reception, DRX, mode of operation used by the group of user equipments, UEs, wherein the base station, gNB, is configured to perform communications [e.g., transmissions and/or receptions] with one or more user equipments, UEs, of the group of user equipments in on-periods of the discontinuous reception, DRX, mode of operation used by the group of user equipments, UEs, described by the discontinuous reception, DRX, configuration information.

Further embodiments provided a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario with a plurality of other user equipments, UEs, using a discontinuous reception, DRX, mode of operation [e.g., in on periods of the DRX mode of operation], wherein the plurality of other user equipments, UEs, use different discontinuous reception, DRX, configurations [e.g., for different services] associated with different priorities and/or QoS requirements for different services, wherein the user equipment, UE, is configured to adapt/adjust its discontinuous reception, DRX, configuration in dependence on one or more selected discontinuous reception, DRX, configurations, selected out of the different discontinuous reception, DRX, configurations used by the plurality of other user equipments, UEs.

In embodiments, the user equipment, UE, is configured to select one or more discontinuous reception, DRX, configurations out of the different discontinuous reception, DRX, configurations based on an operating parameter of the user equipment, UE, wherein the operating parameter of the user equipment, UE, is a battery level of the user equipment, UE, or a QoS requirement [e.g., priority associated with a service].

Further embodiments provide a user equipment, UE, of a wireless communication system [e.g., new radio, NR/5G], wherein the user equipment, UE, is configured to operate in a sidelink in-coverage, out of coverage or partial coverage scenario [e.g., NR sidelink mode 1 or mode 2]], wherein the user equipment, UE, is configured to communicate, in the sidelink scenario with one or more other user equipments, UEs, using a discontinuous reception, DRX, mode of operation [e.g., in on-periods of the DRX mode of operation], wherein the user equipment, UE, comprise a queue for sidelink transmissions sorted according to priorities or quality of service requirements, wherein the user equipment, UE, is configured to modify the queue for the sidelink transmissions in case that a currently pending sidelink transmission is addressed to a user equipment that is currently in a discontinuous reception, DRX, off period, and to rather transmit a sidelink transmission to another user equipment that is currently in a discontinuous reception, DRX, on period.

Further embodiments provide a method for operating an user equipment, UE, of a wireless communication system. The method comprises a step of operating the user equipment, UE, in a sidelink in-coverage, out of coverage or partial coverage scenario [e.g., NR sidelink mode 1 or mode 2]]. Further, the method comprises a step of receiving with the user equipment, UE, in the sidelink scenario [e.g., from another UE of the wireless communication system], sidelink transmissions using a discontinuous reception, DRX, mode of operation [e.g., in on-periods of the DRX mode of operation]. Further, the method comprises a step of adjusting, modifying or stopping an inactivity timer of the discontinuous reception, DRX, mode of operation in dependence on an operating parameter of the user equipment, UE, [e.g., describing an operating condition of the transceiver and/or operating scenario of the transceiver.

Further embodiments provide a method for operating an user equipment, UE, of a wireless communication system. The method comprises a step of operating the user equipment in a sidelink in-coverage, out of coverage or partial coverage scenario [e.g., NR sidelink mode 1 or mode 2]]. Further, the method comprises a step of communicating with the user equipment, UE, in the sidelink scenario, with a plurality of other user equipments, UEs, using a discontinuous reception, DRX, mode of operation [e.g., in on periods of the DRX mode of operation], wherein the plurality of other user equipments, UEs, use different discontinuous reception, DRX, configurations [e.g., for different services] associated with different priorities and/or QoS requirements for different services. Further, the method comprises a step of adapting/adjusting the discontinuous reception, DRX, configuration of the user equipment, UE, in dependence on one or more selected discontinuous reception, DRX, configurations, selected out of the different discontinuous reception, DRX, configurations used by the plurality of other user equipments, UEs.

Further embodiments provide a method for operating an user equipment, UE, of a wireless communication system. The method comprises a step of operating the user equipment, UE, in a sidelink in-coverage, out of coverage or partial coverage scenario [e.g., NR sidelink mode 1 or mode 2]]. Further, the method comprises a step of communicating with the user equipment, UE, in the sidelink scenario with one or more other user equipments, UEs, using a discontinuous reception, DRX, mode of operation [e.g., in on-periods of the DRX mode of operation], wherein a queue is used for sidelink transmissions, the queue sorted according to priorities or quality of service requirements. Further, the method comprises a step of modifying the queue for the sidelink transmissions in case that a currently pending sidelink transmission is addressed to a user equipment that is currently in a discontinuous reception, DRX, off period, and to rather transmit a sidelink transmission to another user equipment that is currently in a discontinuous reception, DRX, on period.

Embodiments described herein are based on the observation of a fundamental fact or principle, i.e., the communication principle:

Observation 1: The main purpose of the sidelink is to guarantee reliable communication.

That means, that it is not allowed that any power saving method impairs or prevents that any UE can receive the transmission of any other UE. As positive statement, the sidelink should ensure that a transmission from any UE in a group of interacting UEs can be received by any other UE in the group independent of the cast type.

In embodiments, a group of interacting UEs (e.g., per defined service) can be defined by UEs in a certain geographical area that potentially can impact each other. Examples are vehicles that are so close that they may collide, giving way to an emergency vehicle or a vulnerable road user (VRU) is at risk to be knocked over, e.t.c.

1. DRX

In embodiments, to reduce power consumption, DRX can be introduced for sidelink. A fundamental rule for the purpose of DRX is the inactivity rule, i.e.

Observation 2: When a UE enters the inactive period it is in sleep mode and should neither receive nor transmit.

In a strict sense DRX is associated to the activity of the receiver of a UE, only. In principle, the transmitter may be active with a different timing pattern which is called DTX. That means, that theoretical two UEs in a unicast connection may use two different DRX patterns in each direction. In the worst case if the DTX and DRX patterns have active times that do not overlap a UE has to wake-up twice. Even if during DTX active time only the transmitter and during DRX only the receiver are activated a real device has to activate a lot of common function so that power saving is suboptimal. For most power saving a UE should process all functions at the same wake-up time to keep the active time as short as possible.

1.1 DRX Alignment 1.1.1 UEs in Mode 2—General Information

A logical consequence of the communication principle defined above according to "Observation 1" is that, in accordance with embodiments, (all) interacting UEs that are using DRX are aligned in time, i.e. the active durations of transmitting UEs is preferably identical and synchronized to the active durations of the receiving UEs. In simple words, transmitting and receiving UEs are preferably awake at the same time. In case of Uu or sidelink mode 1 this is controlled by the gNB. However, this is not possible if interacting UEs operate the sidelink in mode 2 so that they must coordinate each other. Therefore, in embodiments 1. DRX cycle parameters can be distributed to all interacting UEs, and/or
2. (all) interacting UEs may prolong their active time with the inactivity timer, synchronously.

Since sensing provides the SCI information from (all) interacting UEs any transmission is known to all and enables the interacting UEs to start the inactivity timer, synchronously. A second source of information is the reservation and pre-emption information from (all) the SCIs that have been decoded successfully. This provides some redundancy for the case that an SCI decoding fails and a transmission is not detected. As further indication for a transmission RSRP and/or RSSI can be used.

1.1.2 Adaptation of Inactivity Timer Based on Conditions

In embodiments, an inactivity timer can be introduced to extend the active period of a UE. On expiry of the Inactivity timer the UE is supposed to go to sleep. This expected behavior of the Inactivity timer could be enhanced by defined conditions, which would allow a UE to go to sleep prior to timer expiry and thus, to save more energy.

In accordance with embodiments, conditions when a UE changes to sleep mode by stopping the inactivity timer could be defined, e.g., based on the MAC, such as one or more out of the following:

1. a successful data reception or transmission; e.g., the outstanding or expected data was received or transmitted and thus, there is no need for the UE to remain in active mode, but the UE could change to sleep mode;
2. failure scenario(s), e.g., if reception/transmission/decoding fails for one or multiple times (e.g., determined by a counter asking for the introduction of a new counter to count occurrences of the failure);
3. if a new DRX command, e.g., MAC CE, is received, e.g., including a new configuration of DRX or reception or transmission.

1.1.3 Interaction of UEs in Mode 1 and 2 and the gNB

In embodiments, a group of interacting UEs that use DRX may consist of UEs in-coverage and out-of-coverage, i.e., it is a partial-coverage situation. To enable in-coverage UEs to communicate with out-of-coverage UEs their DRX cycles can be aligned as well.

1. Option: gNB Controlled DRX Alignment

Further, if in-coverage UEs operate sidelink in mode 1, i.e., are controlled by the gNB, it follows imperatively that the gNB is also aligned for mode 1 control signaling.

In this case, the gNB can configure the mode 1 UEs which convey the configuration to the mode 2 UEs. This can be regarded as gNB centric configuration. There could be different UE behaviors pertaining to the RRC state the UE is in. When the UE is in RRC connected state the following procedure that a UE receives a DRX configuration via dedicated RRC is possible. While when the UE is in RRC inactive or IDLE state then either the UE has to rely on pre-configuration or get the information via SIB. This is true for the UEs in any cast type.

2. Option: UE Controlled or Determined DRX Alignment

However, in embodiments, another option can be that the gNB accepts the DRX configuration generated by a UE. For example, an interacting group of UEs is in out-of-coverage and at least one UE enters the coverage area of a gNB. If the UEs entering coverage shall switch from mode 2 to mode 1 and the gNB takes over the scheduling of the in-coverage UE or UEs, the gNB may adapt to the already existing or external DRX configuration used by the group. This can be regarded as UE master centric configuration. Indeed, in such a scenario, the gNB needs to be informed about the external DRX configuration to be able to deliver the scheduling grants at least initially. That means, a UE in coverage may signal the DRX configuration to the gNB via the Uu interface. This must not necessarily be the master UE since it may be still out-of-coverage. If more than one UEs are in coverage any of them may take over the signaling. After the initial mode 1 establishment the gNB may take over the DRX configuration control if needed.

Note that while the gNB is preferably aligned with sidelink DRX for mode 1 control signaling (e.g., PDCCH with DCI format 3_x) it must not necessarily align the Uu interface as well. Though, it may seem to be desirable for the sake of power saving, since the UE needs not to wake up twice at different times for Uu and SL but only once for both. I.e., the total wake-up time is shorter. On the other hand, this depends on the amount of shared functionality of a platform device. If SL and Uu are implemented as separate instances the power saving gain is small. Even with shared functions the processing power has to be available for both interfaces, so that the corresponding power consumption adds up. At the end, it is the fixed cost of the device that is lower if the total wake-up time is reduced.

3. Option: Inter-UE Coordination

In case inter-UE coordination is supported, e.g., for resource allocation, in accordance with embodiments, the DRX alignment can be added and exchanged to the supportive signaling exchanged to coordinate inter-UE resource allocation. For example, additionally to the set of resources included in the assistance information, also the DRX configuration or any DRX specific information could be added.

1.1.4 Alignment of RX and TX UEs

If a UE transmits during DRX inactive time no DRX UE is awake that can receive the message and vice versa. Consequently, in embodiments, the DRX timing can be the same for TX and RX.

Additionally, in embodiments, the perspective of both the RX and TX can be taken into account for deciding a DRX configuration.

Precedence of Different DRX Configurations:

Subsequently, UE based DRX configuration (via AS layer or V2X layer) is described. It can happen that a UE is simultaneously maintaining different services, e.g., pertaining to different QoS. In that case, a UE could have a DRX configuration available as a pre-configuration and alternatively another DRX configuration pertaining to other on-going services. In this scenario, in accordance with embodiments, the UE can choose from a union of all the on-going services and available pre-configuration to optimize overall power saving. This can be more feasible from a TX perspective. If the RX power saving is to be emphasized then there can be further restrictions on this overall choice of DRX configuration. E.g., if a RX UE has only 50% of the battery power left, then it can reject any of the DRX configuration provided by the TX which might consume too much power and may therefore not be acceptable/possible to work with only 50% battery power level left. The RX UE may send a PC5-RRCFailureMessage or Reject message to the TX if none of the provided options are sufficient. The failure/reject message may include an alternative proposal of a DRX configuration.

Also, there can be a fixed mapping between the available PQI(s) or each QoS profile in itself. This ensures that there is a limited number of DRX configurations and service profile mapping. Also, a TX or RX UE may at a time have a finite number of services running in parallel. The reflection of the PQI in the AS, e.g., L1, is in terms of 'Priority' and there are 8 possible levels. Based on this, each UE could be provided via higher layers IE, e.g., RRC a set of DRX configuration, e.g., including on duration, inactivity timer, HARQ RTT timer, retransmission timer.

For example, the following table indicates a possible fixed mapping between PQI and DRX configuration:

| PQI -> QoS Profile -> Priority | DRX configuration (e.g. including on duration, inactivity timer, HARQ RTT timer, retransmission timer) |
|---|---|
| 1 | X1 ms, e.g., 20 ms on duration, inactivity timer enabled, HARQ RTT timer enabled, retransmission timer enabled |
| 2 | X2 ms, e.g., 40 ms on duration, inactivity timer enabled, HARQ RTT timer disabled, retransmission timer enabled |
| 3 | X1 ms, e.g., 60 ms on duration, inactivity timer enabled, HARQ RTT timer enabled, retransmission timer enabled |
| 4 | X1 ms, e.g., 80 ms on duration, inactivity timer enabled, HARQ RTT timer enabled, retransmission timer enabled |
| 5 | X1 ms, e.g., 80 ms on duration, inactivity timer enabled, HARQ RTT timer enabled, retransmission timer enabled |
| 6 | X1 ms, e.g., 100 ms on duration, inactivity timer disabled, HARQ RTT timer enabled, retransmission timer enabled |
| 7 | X1 ms, e.g., 100 ms on duration, inactivity timer disabled, HARQ RTT timer disabled, retransmission timer disabled |
| 8 | X1 ms, e.g., 100 ms on duration, inactivity timer enabled, HARQ RTT timer disabled, retransmission timer enabled |

Note that particular PQIs can also be combined when one QoS profile is more relevant to a particular service.

Another case is when the default DRX configuration is not apt for the UE. E.g., if a UE has been made available a pre-configured or default DRX configuration and this does not suffice the QoS requirement of the UE. This implies for one or more service the UE is not going to meet one of the QoS profile, e.g., latency (PDB). In this scenario a UE should be provided with a DRX offset mapping w.r.t either the service (ITS ID) or PQIs or both. This will help the UE to align the start offset of the DRX cycle corresponding to information from the V2X layer. The prioritization of which service is important should also be included in the mapping provided by the V2X layer.

Example

| DRX offset: Active time and/or inactivity timer (in ms) | ITS services | PQI (PDB, MDBV, GBR) | DRX Prioritization rule |
|---|---|---|---|
| 100 ms | Service 1 - Sensor sharing | Service 1: PDB 100 ms, | The TX UE then chooses to either extend the ongoing DRX On duration based on the highest priority data only or follows this highest PQI data until the service is complete |
| 10 ms | Service 2 - Lane merging | Service PDB - 10 ms | |

Subsequently, network based DRX configuration is described. When the UEs are in coverage and, e.g., in RRC connected state at that time a UE should be mandated to follow the DRX configuration the NW dictates. A TX UE or RX UE can indicate to the network a preferred DRX configuration which can be taken into account by the network for deciding the DRX configuration for a TX or RX UE. Also, instead of both UEs reporting a preferred DRX configuration to the NW, only TX can report a preferred DRX configuration to the NW. This could be like an inter UE DRX signaling to the NW. The reporting interval of the RX or TX UE could be based on certain conditions, e.g., (re)-transmission time, PQI(s), location of the UE or it could be opportunistic.

1.1.5 UEs in Multiple Interacting Groups or with Different DRX Configurations

In accordance with embodiments, it is possible that UEs have to interact with more than one group. For example, during rush hours in a city a vehicle leaves a road junction and approaches the next one. In between it may be necessary to communicate with road users in both areas. Other reasons for differing DRX cycles are that each UE selects an individual DRX pattern, e.g., dependent on location, service, QoS, e.t.c.

If multiple DRX configurations have to be obeyed, in accordance with embodiments, the active times of a UE are the union of all ongoing DRX patterns.

Multiple DRX configurations can be optimized to minimize the union. For example, configuring the DRX of different UEs with as much as possible overlapping ON-durations. If as a corner case a DRX cycle would be an integer multiple of another, the involved DRX UEs do not even need to interrupt the inactivity period.

1.1.5.1 Coordination of Multiple DRX Configurations

In embodiments, in case that UEs in an interacting group have selected differing DRX patterns, they may need to inform each other about their DRX configuration. Since UEs might not know about the other's configurations, in accordance with embodiments, a default DRX configuration is defined that is known before any communication can be done. This default configuration may differ among the UEs if it can be derived from a factor that is known to everyone in the group.

Alternatively, a UE may enter non-DRX and receive SCIs or signaling from the other UEs and collect the source IDs and signaling of DRX indications. This would be supported if each DRX UE broadcasts its DRX configuration.

If the UE is in coverage the gNB can signal the DRX configurations of all UEs that the RAN network tracks and regards to be in proximity to that UE, in other words, that can be considered as members of the corresponding interacting group.

In embodiments, each UE can scan for and track the UEs in proximity, i.e., UEs that are potential members of the interacting group, and build up and maintain a device list with the context of them. This is similar to mobility between cells on the Uu interface. That means, the other UEs are treated like cells. For each UE on the list a set of parameters is maintained, which can be one or more out of

- ID of the UE, L1 and/or L2;
- Relative timing, for example the difference in SFN, if they deviate;
- RSRP and RSSI;
- CQ;
- DRX parameters for transmission and reception, such as
  - cycle,
  - offset,
  - inactivity timer,
  - retransmission timer,
  - e.t.c.;
- Other parameters, e.g., for synchronization, relay, e.t.c.

In embodiments the list can be updated from any received information from other UEs, like SCI, signaling and data traffic.

In the other direction, if a UE decides to change its DRX pattern it can broadcast the new parameters so that all other UEs can update the corresponding entry in their lists.

1.1.5.2 Unicast Link Establishment Procedure and DRX

In embodiments, the UEs interested in establishing the PC5 unicast can start with a common DRX configuration (e.g., common for a service or common for a QoS/priority or common for all cast types or common within a geographical location) for the PC5 link establishment. They can continue with the negotiation procedure of the DRX in the AS, e.g., via PC5-RRC.

1.1.6 Sensing and DRX

The inactivity rule ("Observation 2" in section 1) enforces that sensing is only possible during the active time. SCI decoding has to be done continuously to detect scheduling grants. This provides the theoretical maximum of information about resource occupation and thus is equivalent to sensing. That means, sensing is virtually and inherently done during the whole active time, i.e. it is a spin-off product of SCI detection. Consequently, sensing does not cause any extra cost, e.g., power consumption.

Therefore, sensing and DRX can be fully aligned without wasting additional power. In other words, no power can be saved, if sensing is only partly done and not performed during the whole DRX active duration.

Figure 8:
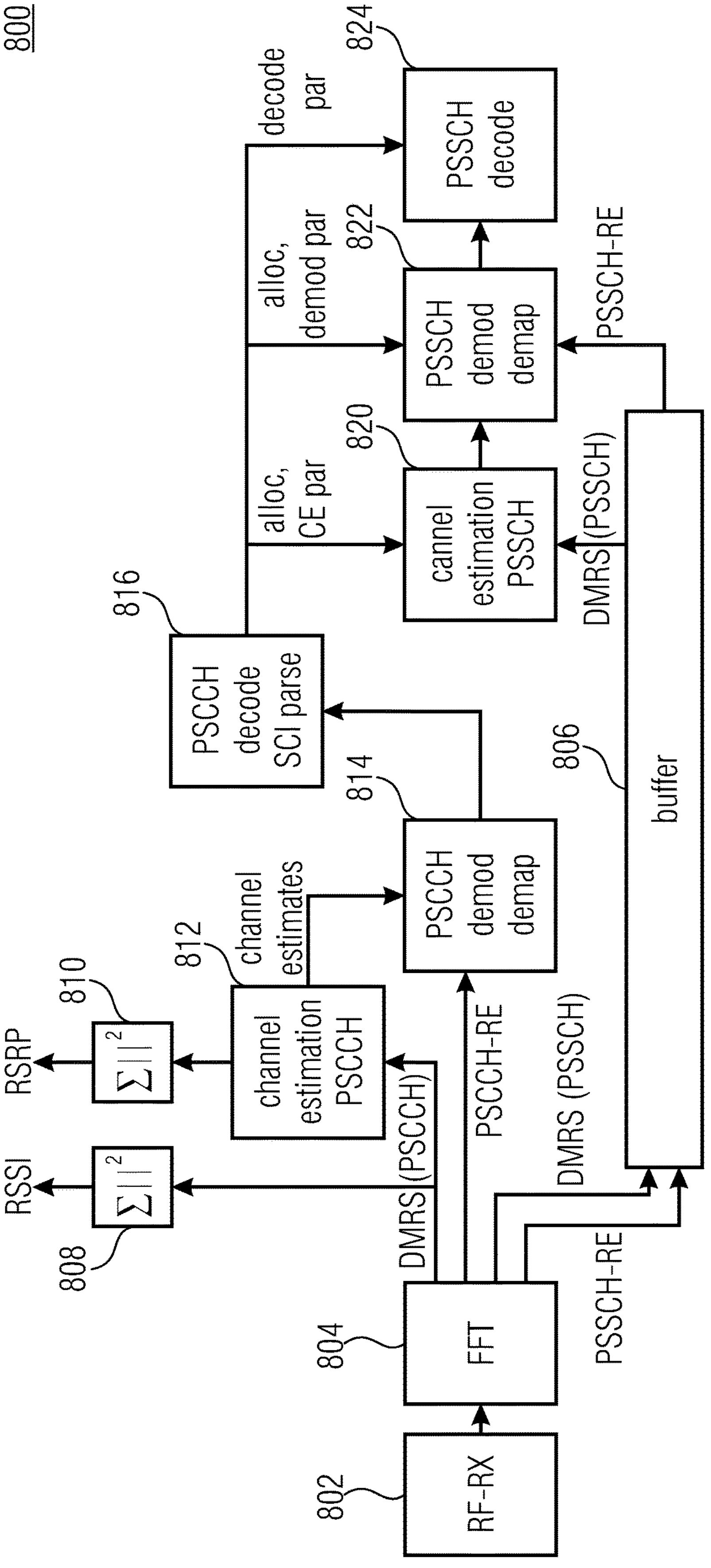
FIG. 8 shows a schematic block diagram of a receiver of a UE.

The consequence for DRX UEs is that for the first slot of the ON-duration no sensing information is available. However, if all UEs use DRX there is nothing to sense before the first slot since all are inactive. So, it does not make sense to break the inactivity rule just for sensing. However, as described in section 1.2, DRX UEs can co-exist with non-DRX UEs. To support aperiodic traffic, resource reservation has been introduced for NR based V2X sidelink in 3GPP release 16. A UE can reserve up to three resources subsequent in time, where the first is for the transmission including the reservation of the up to two subsequent transmissions. The specification mandates that all transmissions, i.e., from the first transmission with the reservations to the last data transmission, should be fulfilled within a reservation window W=32 slots. Therefore, it may make some sense to start sensing the W−1 slots before the next ON-duration in the inactivity period. That would give some information about the reservations of the non-DRX UEs that spill into the ON-duration but it would not give any information about the changed situation when the DRX UEs wake up. However, that does not mean to break the inactivity rule since stopping the sleep period earlier is equivalent to adopt just another DRX configuration. The difference to a normal ON-duration is that only the receiver function for SCI reception are activated, i.e. the greyed function blocks 820, 822, 824 of a receiver shown in the block diagram in FIG. 8 are not executed in the first W−1 slots. So the ON-duration can be regarded to consist of two phases, a first with a lower and a second with the full power consumption.

Specifically, FIG. 8 shows a schematic block diagram of a receiver 800 of a UE. The receiver comprises a RF receiver unit 802, a FFT unit 804, a buffer 806, a RSSI determination unit 808, a RSRP determination unit 810, a PSCCH channel estimation unit 812, a PSCCH demodulation and demapping unit 814, a PSCCH decoding and SCI parsing unit 816, a PSSCH channel estimation unit 820, a PSSCH demodulation and demapping unit 822 and a PSSCH decoding unit 824. Thereby, the PSSCH channel estimation unit 820, the PSSCH demodulation and demapping unit 822 and the PSSCH decoding unit 824 might not be executed in the first W−1 slots.

From the above the following options can be derived:

In case of traffic arrival, i.e., a UE is triggered to transmit, the UE may start sensing W−1 slots before the ON-duration by activating only the functions to receive SCI accepting the additional power consumption in a first phase of a two-phase ON-duration. The second phase is the active duration.

Non-DRX UEs are not allowed to transmit a reservation before the ON-duration for resource allocations in the ON-duration. In other words reservation signaling before the ON-duration should be fulfilled in the inactive period. Reservations for allocations during the ON-duration should be transmitted after start of the ON-duration. This can be ensured either by a periodical broadcast of DRX message from a P-UE or DRX capable UE. The non-DRX UE can then ensure a transmission parameter adaptation based on the received broadcast from the DRX enabled UE. This might be handled in the V2X layer.

1.1.7 Resource Selection and DRX Impact

For resource selection part, the selection window can also include the DRX on duration. There is a selection window where UE determines after sensing which resources are best to transmit on. Then there is the reevaluation window in which the UE can review the selected resources. Within this reevaluation window the UE can review also if the resources that will be selected are aligned with the DRX configuration for the UE. The ones that are not aligned with the UEs DRX configuration can be excluded from reporting to the MAC.

Else, all the resources are reported after the re-evaluation window but the MAC does not select the resources randomly. The MAC has to first discard the resources not aligned with the DRX configuration and then from the remaining set chose the resources. This might not be the best way as then the resource set might be reduced at L2.

1.1.8 Periodic Traffic

In embodiments, DRX cycles can be aligned with periodic traffic. It follows then from the control channel rule that so called partial sensing is equivalent to sensing in DRX. Under these circumstances, the so called partial sensing does not miss any information for resource selection and does not consume any additional power as already explained above. That means, that the power saving is owed to DRX and not partial sensing.

1.1.9 Logical Channel Prioritization and DRX Impact

LCP determines which destination IDs should be given the first transmission chance compared to others in the queue. In accordance with embodiments, when the DRX is enabled for the UEs, then this prioritization should not be limited to only Priority associated to the packet and the Destination ID but also consider the DRX status of the UE. For example, one UE can have a packet with Priority 1 but the intended RX is in the sleep mode. In this case, it does not make sense to send this packet out first. Hence, other packet associated to, e.g., Priority 3 should be transmitted first as the intended destination ID of the RX is in active mode. The MAC entity shall for each SCI corresponding to a new transmission or a re-transmission select a destination associated to one of unicast, groupcast and broadcast, having at least one of the MAC CE and the logical channel with the highest priority and or active SL DRX, among the logical channels that satisfy all the following conditions and MAC CE(s), if any, for the SL grant associated to the SCI.

1.1.10 Conclusion

The conclusion from section 1.1 is that for maximum power saving, in accordance with embodiments, the possibly multiple DRX configurations are coordinated among all interacting UEs and a possibly involved gNB. In the optimal case a common DRX configuration can be determined for the sidelink, where DRX and DTX are aligned. This is independent from the sidelink mode and the cast type. Sensing can be aligned with DRX as well.

The common DRX configuration can be decided by a gNB and distributed to in-coverage UEs and at least one of them forwards it to out-of-coverage UEs that can be reached via sidelink. Another option is that the gNB adopts the DRX configuration from a UE. If no gNB is involved, one of the UEs in the interacting group acts as a master and generates and broadcasts it to the group. If all of that are not available, a default configuration may be used.

1.2 Coexistence of DRX and Non-DRX UEs

In embodiments, a UE may decide not to use DRX if power consumption is irrelevant. Since a non-DRX UE receives continuously it will not miss any transmission from a DRX UE. In the other direction it has to consider DRX when it transmits. That means, regardless if a UE uses DRX or not it should know the common or multiple DRX configuration(s) in the group of interacting UEs to be able to reach DRX UEs.

Under this condition it is possible that DRX and non-DRX UEs can communicate with each other. If more than one non-DRX UEs are in the interacting group they can communicate in groupcast or unicast during the sleep period of the DRX UEs. This allows to reduce congestion on the resource pool.

For example, vehicles, which do need to save power, exchange vehicle specific messages. Corresponding use cases would be platooning or signaling from road signs or traffic lights. I.e., the purpose of a message determines if DRX has to be obeyed or not.

1.2.1 Communication During Common Inactive Periods

In embodiments, an intermediate mode between DRX and non-DRX is feasible when DRX UEs agree to communicate during the common inactivity period. The common inactivity period can be defined by the sleep period normally entered according to the common DRX configuration. I.e. it begins when the common, i.e. synchronous, active time ends.

Obviously, to agree on such an exceptional ON-duration an initial contact between two DRX UEs or a non-DRX UE and DRX UE is needed. This is only possible during the common ON-time independent of cast type.

For example, a UE that initiates a communication somewhere within a common inactivity period in the future may select groupcast or unicast. It may send a message that requests communication and includes the corresponding time. This message could be an alternative type of reservation signaling that is not bound to the reservation window W.

The target UEs are then informed about the communication time and wake up accordingly. If a target UE does not agree to the time it has to respond with a decline message that may include an alternative time proposal before the common ON-duration ends.

1.3 Transmission Clustering in DRX

The probability of the need to transmit a message likely increases with the duration of the sleep period. That may have the effect that many UEs attempt to select resources for reservation SCIs in the first slots of the ON-duration. This is regarded as transmission clustering that may cause a considerably increased collision probability.

Therefore, it may be beneficial to distribute the transmissions of reservations in time over the ON-duration. A simple method is that each UE applies a random back-off, i.e. a random delay from the start of the ON-duration to transmit a reservation. The maximum back-off can be configured as a percentage of the configured ON-time, i.e. the ON-time without prolongation by an inactivity time.

The configuration of the back-off can be influenced by/depend on the delay budget and QoS required by every UE. It may also be based on the QoS and different delay budget of applications within the network.

It is obvious that a UE which wants to transmit in the first slot of the ON-time can only use random selection, if the inactivity rule ("Observation 2", section 1) is obeyed. If reception of the SCI for the purpose of "sensing-only" is started in advance already in the sleep period, as mentioned in the first option in section 1.1.5.1, only information about reservations of non-DRX can be obtained. If such reservations are mapped to the first slot of the ON-time they can be excluded from the random selection. This can be regarded as conditional random selection.

1.4 Impact of Reservations on the Inactivity Timer

State of the art DRX on Uu interface prolongs the active time beyond the ON-duration if traffic is ongoing. Each time a scheduling grant, i.e. PDCCH, is received a timer is started, called the inactivity timer. The UE stays active until the end of the ON-duration or termination of the inactivity timer whichever is last. With that the active time is adaptively prolonged if traffic is ongoing.

This principle can be adopted for sidelink, however, reservations cause a different behavior and must be considered. A reservation can be done for up to three resources and it should not happen that the UE enters sleep mode between them before all are fulfilled, for example, if

- resources are reserved after the ON-duration and inactivity time is too short;
- resources reserved after the ON-duration may have a distance longer than the inactivity time.

Therefore, the active period can be prolonged at least until the last reservation announced by all UEs in the interacting group. If an inactivity timer is configured with a non-zero value it can be started by each transmission or reception so the UE enters sleep at the inactivity time after the last reserved resource.

Assuming that all UEs in the interacting group receive the reservation signaling of the last resources they have to equally prolong their active time synchronously. In practice, however, SCI may be missed due to bad channel conditions or collisions, so that the active time may deviate between UEs. This can be handled in two ways:

- Accept the deviations and the consequence of a probability of missed SCIs und thus messages.
- The former can be avoided by setting the inactivity timer to 0, since then the active time is always the ON-time.

1.5 Loss or Mismatch of DRX Configuration and Alignment

There are situation, where the DRX configuration of a UE mismatches that of its interacting group. For example, due to one or more out of

- joining a new group,
- configuration fails,
- missing a new configuration,
- out of coverage and no other UE in communication range, e.t.c.

To cope with such cases, in embodiments, a UE can be able to autonomously detect loss of DRX alignment and estimate the DRX configuration of a potential interacting group of UEs within communication range.

Loss of alignment (LOA) may be detected by one or more out of

- RSRP and/or RSSI below a threshold during the current ON-duration for a reasonable number of DRX cycles,
- no SCI detected for a reasonable number of DRX cycles,
- multiple failed attempts to establish a unicast connection using the DRX parameters on the device list.

The number of DRX cycles or unsuccessful connection attempts after which the decision is taken that an LOA occurs can be a default value or included in the DRX configuration.

If LOA is detected, the UE can enter non-DRX operation and either request or wait for a DRX configuration signaling. The need for a request may depend on one or more out of

- a time-out when waiting for a DRX configuration signaling,
- QoS,
- traffic density gained by measuring CBR or the number of detected SCIs during a reasonable time,
- location,
- e.t.c.

While reception is safe with non-DRX this is not the case for transmission, since it must be done during the active time of the DRX configuration used by the interacting group in communication range. Therefore, a DRX configuration request has to be transmitted within the active time to be successful.

If the UE is in coverage it can use the Uu interface. In out of coverage the following three methods can be used.

According to a first method, a DRX active time detection can be performed.

Thereby, the UE may estimate the DRX configuration from a record of an activity profile from

- RSRP and/or RSSI measurements, and/or
- SCI detection for at least two DRX cycles. From that the most probable active times can be estimated for resource selection.

At the first glance this method may be regarded as state of the art sensing. However, it is fundamentally different due to its purpose. State of the art sensing with the purpose of resource selection seeks for estimating free resources. DRX active time detection, on the other hand, is to be regarded as a sensing with the primary purpose to find periods where occupied resources occur. The secondary purpose is to estimate free resources within those periods to select resources for the DRX configuration request. In other word, it is a conditional resource selection, where the condition is an estimated active time. The resource selection may be sensing based or random.

According to a second method, a SCI triggered resource selection can be performed.

Thereby, as soon as a UE detects an SCI it assumes an active time. If the SCI includes resource reservations the UE may assume an active time at least from the SCI reception up to the slot of the last reserved resource signaled in the SCI. This active time estimation of the active time may be updated by allocations signaled in other SCIs. The UE can then select a resource within the estimated active time according to state of the art resource selection.

If an SCI is detected but no reservation information is available the UE can randomly select a resource as soon as possible after the trigger by the SCI detection.

According to a third method, a repeated random resource selection can be performed.

Thereby, the UE blindly transmits the request repeatedly at random time distances until a DRX configuration message arrives as response.

2. Further Embodiments

Figure 9:
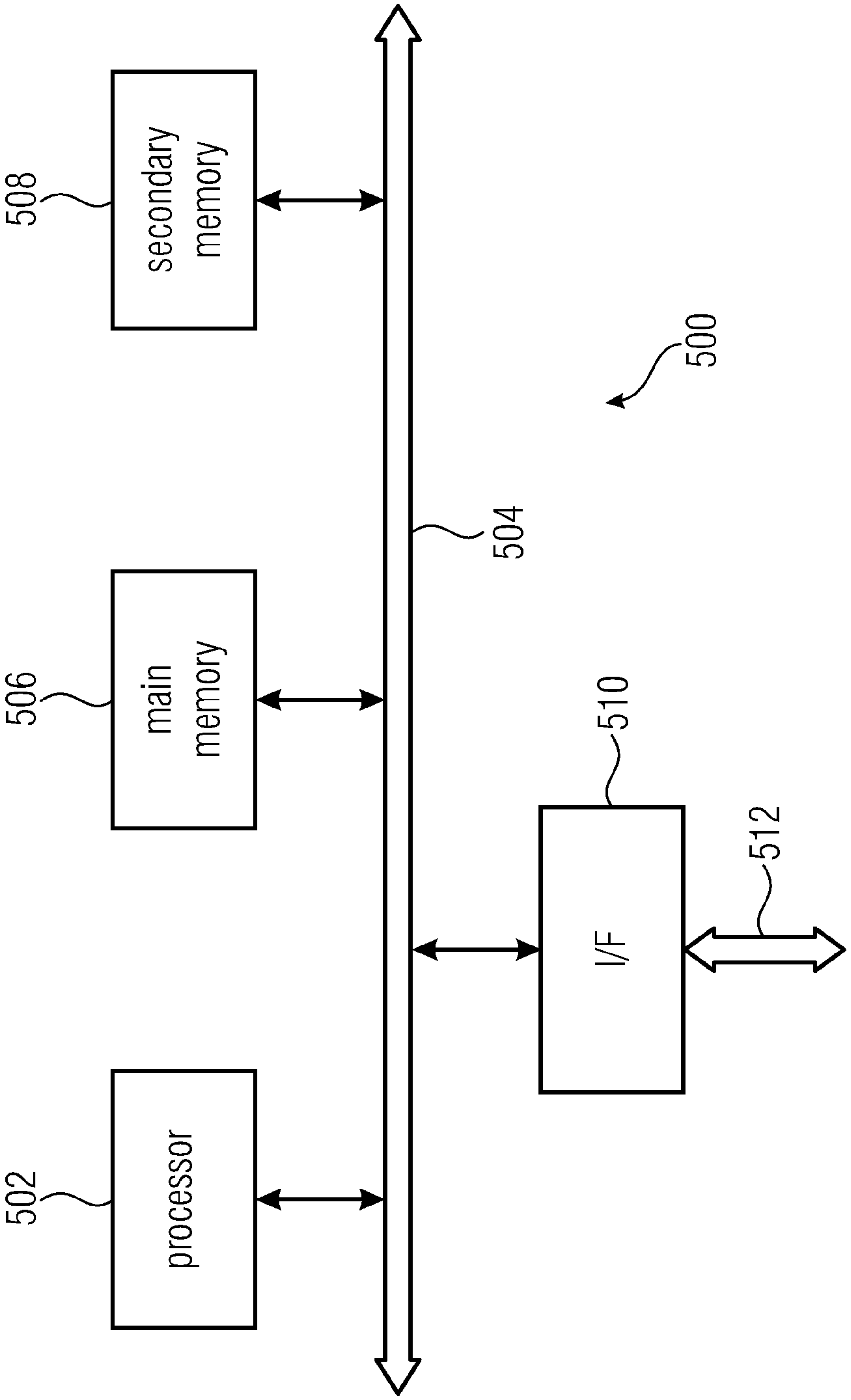
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form of electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF REFERENCES

[1] Final Report of 3GPP TSG RAN WG1 #99 v1.0.0, Reno, USA, 18-22 Nov. 2019
[2] Sidelink Resource Allocation Mechanism for NR V2X, Qualcomm Incorporated, R1-2000963, 3GPP TSG RAN WG1 Meeting #100-e
[3] TS 38.213, Physical layer procedures for control (Release 16)
[4] TS 38.214, Physical layer procedures for data (Release 16)

ABBREVIATIONS

3GPP third generation partnership project
ACK acknowledgement
AIM assistance information message
AL alert limit
AMF access and mobility management function
ARAIM advanced receiver autonomous integrity monitoring
BS base station
BWP bandwidth part
CA carrier aggregation
CC component carrier
CBG code block group
CBR channel busy ratio
CE control element
CQI channel quality indicator
CSI channel state information
CSI-RS channel state information-reference signal
D2D device-to-device
DAI downlink assignment index
DCI downlink control information
DL downlink
FFT fast Fourier transform
FR1 frequency range one
FR2 frequency range two
GBR guaranteed bit rate
GMLC gateway mobile location center
gNB evolved node B (NR base station)/next generation node B base station
GNSS global navigation satellite system
HAL horizontal alert limit
HARQ hybrid automatic repeat request
IoT internet of things
LCP link control protocol
LCS location services
LMF location management function
LOA level of automation
LPP LTE positioning protocol
LTE long-term evolution
MAC medium access control
MCR minimum communication range
MCS modulation and coding scheme
MIB master information block
MO-LR mobile originated location request
MT-LR mobile terminated location request
MDBV maximum data burst volume
NACK not acknowledgement
NB node B
NI-LR network induced location request
NR new radio
NRPPa NR positioning protocol-annex
NTN non-terrestrial network
NW network
NR new radio
OFDM orthogonal frequency-division multiplexing
OFDMA orthogonal frequency-division multiple access
PBCH physical broadcast channel
PC5 interface using the sidelink channel for D2D communication
PDB packet delay budget
PDCCH physical downlink control channel
PDSCH physical downlink shared channel
PL protection level
PLMN public land mobile network
PPP point-to-point protocol
PPP precise point positioning
PQI PC5 5G NR standardized QoS identifier
PRACH physical random access channel
PRB physical resource block
PRS public regulated services (Galileo)
PSCCH physical sidelink control channel
PSFCH physical sidelink feedback channel
PSSCH physical sidelink shared channel
PUCCH physical uplink control channel
PUSCH physical uplink shared channel PVT position and/or velocity and/or time
PVT position, velocity and time
RAIM receiver autonomous integrity monitoring
RAN radio access networks
RAT radio access technology
RB resource block
RF radio frequency
RNTI radio network temporary identifier
RP resource pool
RRC radio resource control
RS reference symbols/signal
RTK real time kinematics
RTT round trip time
RX receiver/receiving
SBAS space-based augmentation systems
SBI service based interface
SCI sidelink control information
SI system information
SIB sidelink information block
SL sidelink
SSR state space representations
TB transport block
TTI short transmission time interval
TDD time division duplex
TDOA time difference of arrival
TIR target integrity risk
TRP transmission reception point
TTA time-to-alert
TTI transmission time interval
TX transmitter/transmitting
UAV unmanned aerial vehicle
UCI uplink control information
UE user equipment
UL uplink
UMTS universal mobile telecommunication system
V2X vehicle-to-everything
V2V vehicle-to-vehicle
V2I vehicle-to-infrastructure
V2P vehicle-to-pedestrian
V2N vehicle-to-network
P-UE pedestrian UE
V-UE vehicular UE
VRU vulnerable road user

The invention claimed is:

1. A user equipment, UE, of a wireless communication system, wherein the user equipment, UE, is configured to operate in new radio sidelink mode 1, wherein the user equipment, UE, is configured to receive, in a sidelink scenario, sidelink transmissions using a discontinuous reception, DRX, mode of operation, wherein the user equipment, UE, is configured to adjust, modify or stop an inactivity timer of the discontinuous reception, DRX, mode of operation in dependence on an operating parameter of the user equipment, UE, wherein the user equipment, UE, is configured to communicate in the new radio sidelink mode 1 with a group of other user equipments, UEs, wherein the user equipment, UE is configured to receive from a base station, gNB, of the wireless communication system a discontinuous reception, DRX, configuration information and to adjust at least one parameter of the discontinuous reception, DRX, mode of operation in dependence on the discontinuous reception, DRX, configuration information, wherein the user equipment, UE, is configured to transmit to one or more other UEs of the group of other UEs, that are operating in a new radio sidelink mode 2, the discontinuous reception, DRX, configuration information, wherein the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to transmit sidelink control information carrying a resource reservation information indicating one or more resources reserved by the user equipment, UE, for a sidelink transmission, wherein user equipment is configured, in case that at least one of the one or more resources reserved by the user equipment, UE, are located within an on-period of the discontinuous reception, DRX, mode of operation of the other user equipments, UEs, to transmit the sidelink control information only in an on-period of the discontinuous reception, DRX, mode of operation of the other user equipments, or wherein user equipment is configured, in case that at least one of the one or more resources reserved by the user equipment, UE, are located within an off-period of the discontinuous reception, DRX, mode of operation of the other user equipments, UEs, to transmit the sidelink control information in an off-period of the discontinuous reception, DRX, mode of operation of the other user equipments.

2. The user equipment, UE, according to claim 1, wherein the operating parameter is one out of a successful sidelink data reception or data transmission, a failure scenario, a reception of a new DRX command.

3. The user equipment, UE, according to claim 1, wherein the user equipment, UE, is configured to operate in the new radio sidelink mode 2, wherein the user equipment, UE, is configured to communicate in the new radio sidelink mode 2 with a group of other user equipments, UEs, wherein the user equipment, UE, is configured to receive, in the new radio sidelink mode 2 sidelink transmissions from one or more other UEs of the group of other UEs using a discontinuous reception, DRX, mode of operation, wherein the user equipment, UE is configured to receive from another user equipment of the group of user equipments, UEs, a discontinuous reception, DRX, configuration information and to adjust at least one parameter of the discontinuous reception, DRX, mode of operation in dependence on the discontinuous reception, DRX, configuration information.

4. The user equipment, UE, according to claim 1, wherein the user equipment, UE, is configured to communicate in the sidelink scenario with a group of other user equipments, UEs, wherein the user equipment, UE, is configured to receive, in the sidelink scenario sidelink transmissions from one or more other UEs of the group of other UEs using the discontinuous reception, DRX, mode of operation, wherein the user equipment, UE, is configured to change/switch from the new radio sidelink mode 2 to the new radio sidelink mode 1, wherein the user equipment, UE is configured, in the new radio sidelink mode 1, to transmit to a base station, gNB, of the wireless communication system a discontinuous reception, DRX, configuration information describing the discontinuous reception, DRX, mode of operation used by the user equipment, UE, and/or the group of other user equipments, UEs.

5. The user equipment, UE, according to claim 1, wherein the user equipment, UE, is configured to receive sidelink transmissions using the discontinuous reception, DRX, mode of operation, from at least two other user equipments, UEs, the at least two other user equipments, UEs, using different discontinuous reception, DRX, configurations, wherein a discontinuous reception, DRX, configuration used by the user equipment in the discontinuous reception, DRX, mode of operation is adjusted to the different discontinuous reception, DRX, configurations used by at least two other user equipments, UEs.

6. The user equipment, UE, according to claim 5, wherein the discontinuous reception, DRX, configuration of the user equipment is adjusted to the different discontinuous reception, DRX, configurations such that on periods of the discontinuous reception, DRX, configuration of the user equipment match on periods of more than one or all of the different discontinuous reception, DRX, configurations.

7. The user equipment, UE, according to claim 1, wherein the user equipment, UE, is configured to receive, in the sidelink scenario, a discontinuous reception, DRX, configuration information describing the discontinuous reception, DRX, mode of operation used by another user equipment, UE, of the wireless communication system, wherein the user equipment, UE, is configured to receive the discontinuous reception, DRX, configuration information using one out of a non-discontinuous reception, DRX, mode of operation, a discontinuous reception, DRX, mode of operation with a standard/preconfigured discontinuous reception, DRX, configuration, a uU interface in case of new radio sidelink mode 1, wherein the user equipment is configured to at least one out of adjust/modify its discontinuous reception, DRX, configuration in accordance with the received discontinuous reception, DRX, configuration information, update a device list by storing the received discontinuous reception, DRX, configuration information together with an indication of the other user equipment in the device list.

8. The user equipment, UE, according to claim 1, wherein the user equipment, UE, is configured to receive, in the sidelink scenario sidelink control information, SCI, from at least one other user equipment, UE, of the wireless communication system using a discontinuous reception, DRX, mode of operation, wherein the user equipment, UE, is configured to derive a sensing information from the sidelink control information, SCI, the sensing information describing an occupancy of a sidelink resource pool.

9. The user equipment, UE, according to claim 8, wherein the user equipment is configured to derive the sensing information from the sidelink control information by decoding the sidelink control information.

10. The user equipment, UE, according to claim 8, wherein the user equipment, UE, is configured to determine a set of candidate resources for a sidelink transmission based on the sensing information, wherein the user equipment, UE, is configured to perform the sidelink transmission in one or more selected resources selected out of the set of candidate resources.

11. The user equipment, UE, according to claim 8, wherein the user equipment, UE, is configured to communicate, in the sidelink scenario, with a group of other user equipments, UEs, at least a subset of other user equipments, UEs, of the group of other user equipments, UEs, operating in a non-discontinuous reception, non-DRX, mode of operation, wherein the user equipment, UE, is configured to receive sidelink control information only for a predefined time period prior to the on-duration of the discontinuous reception, DRX, mode of operation.

12. The user equipment according to claim 1, wherein the user equipment, UE, is configured to only determine those resources as a set of candidate resources or to only select those resources out of the set of candidate resources that fall within an on-period of the discontinuous reception, DRX, mode of operation.

13. The user equipment, UE, according to claim 1, wherein the user equipment, UE, is configured to receive, in the sidelink scenario, sidelink transmissions using a discontinuous reception, DRX, mode of operation, wherein the user equipment, UE, is configured to align on-periods and/or a cycle of the discontinuous reception, DRX, mode of operation in accordance with periodic traffic for receiving the periodic traffic.

14. The user equipment, UE, according to claim 1, wherein the user equipment, UE, is configured to receive a resource reservation information during an on-period of the discontinuous reception, DRX, mode of operation, wherein the user equipment, UE, is configured to one out of adjust an inactivity timer of the discontinuous reception, DRX, mode of operation in dependence on the resource reservation information, restart an inactivity timer of the discontinuous reception, DRX, mode of operation in dependence on the resource reservation information.

15. A method for operating a user equipment, UE, of a wireless communication system, wherein the method comprises:

operating the user equipment, UE, in a new radio sidelink mode 1, receiving with the user equipment, UE, in a sidelink scenario, sidelink transmissions using a discontinuous reception, DRX, mode of operation, adjusting, modifying or stopping an inactivity timer of the discontinuous reception, DRX, mode of operation in dependence on an operating parameter of the user equipment, UE, communicating in the new radio sidelink mode 1 with a group of other user equipments, UEs, receiving from a base station, gNB, of the wireless communication system a discontinuous reception, DRX, configuration information and adjusting at least one parameter of the discontinuous reception, DRX, mode of operation in dependence on the discontinuous reception, DRX, configuration information, transmitting to one or more other UEs of the group of other UEs, that are operating in a new radio sidelink mode 2, the discontinuous reception, DRX, configuration information, communicating, in the sidelink scenario, with a group of other user equipments, UEs, at least a subset of other user equipments, UEs, of the group of other user equipments, UEs, operating in a non-discontinuous reception, non-DRX, mode of operation, transmitting sidelink control information carrying a resource reservation information indicating one or more resources reserved by the user equipment, UE, for a sidelink transmission, transmitting, in case that at least one of the one or more resources reserved by the user equipment, UE, are located within an on-period of the discontinuous reception, DRX, mode of operation of the other user equipments, UEs, sidelink control information only in an on-period of the discontinuous reception, DRX, mode of operation of the other user equipments, or transmitting, in case that at least one of the one or more resources reserved by the user equipment, UE, are located within an off-period of the discontinuous reception, DRX, mode of operation of the other user equipments, UEs, sidelink control information in an off-period of the discontinuous reception, DRX, mode of operation of the other user equipments.

16. A non-transitory digital storage medium having stored thereon a computer program for performing a method for operating a user equipment, UE, of a wireless communication system, wherein the method comprises:

operating the user equipment, UE, in a new radio sidelink mode 1, receiving with the user equipment, UE, in a sidelink scenario, sidelink transmissions using a discontinuous reception, DRX, mode of operation, adjusting, modifying or stopping an inactivity timer of the discontinuous reception, DRX, mode of operation in dependence on an operating parameter of the user equipment, UE, communicating in the new radio sidelink mode 1 with a group of other user equipments, UEs, receiving from a base station, gNB, of the wireless communication system a discontinuous reception, DRX, configuration information and adjusting at least one parameter of the discontinuous reception, DRX, mode of operation in dependence on the discontinuous reception, DRX, configuration information, transmitting to one or more other UEs of the group of other UEs, that are operating in a new radio sidelink mode 2, the discontinuous reception, DRX, configuration information, communicating, in the sidelink scenario, with a group of other user equipments, UEs, at least a subset of other user equipments, UEs, of the group of other user equipments, UEs, operating in a non-discontinuous reception, non-DRX, mode of operation, transmitting sidelink control information carrying a resource reservation information indicating one or more resources reserved by the user equipment, UE, for a sidelink transmission, transmitting, in case that at least one of the one or more resources reserved by the user equipment, UE, are located within an on-period of the discontinuous reception, DRX, mode of operation of the other user equipments, UEs, sidelink control information only in an on-period of the discontinuous reception, DRX, mode of operation of the other user equipments, or transmitting, in case that at least one of the one or more resources reserved by the user equipment, UE, are located within an off-period of the discontinuous reception, DRX, mode of operation of the other user equipments, UEs, sidelink control information in an off-period of the discontinuous reception, DRX, mode of operation of the other user equipments, when the computer program is run by a computer.

* * * * *